United States Patent [19]
Kozaki et al.

[11] Patent Number: 5,124,977
[45] Date of Patent: Jun. 23, 1992

[54] SWITCHING SYSTEM FOR SWITCHING CELLS HAVING ERROR DETECTION APPARATUS

[75] Inventors: Takahiko Kozaki, Koganei; Yoshito Sakurai, Yokohama, both of Japan

[73] Assignee: Hitachi, Ltd., Tokyo, Japan

[21] Appl. No.: 482,090

[22] Filed: Feb. 20, 1990

[30] Foreign Application Priority Data

Feb. 22, 1989 [JP] Japan ................... 1-040230

[51] Int. Cl.⁵ .................................. H04Q 11/04
[52] U.S. Cl. ................................. 370/58.1; 370/60
[58] Field of Search .............. 370/60, 58.1, 67; 371/40.2, 40.3, 13

[56] References Cited

U.S. PATENT DOCUMENTS

| | | | |
|---|---|---|---|
| 4,249,253 | 2/1981 | Gentili et al. | 371/40.3 |
| 4,408,326 | 10/1983 | Takeuchi et al. | 371/40.3 |
| 4,617,660 | 10/1988 | Sakamoto | 371/40.2 |
| 4,771,419 | 9/1988 | Graves et al. | 370/60 |
| 4,910,731 | 3/1990 | Sakurai | 370/60 |
| 4,956,839 | 9/1990 | Torii et al. | 370/60 |

Primary Examiner—Douglas W. Olms
Assistant Examiner—T. Samuel
Attorney, Agent, or Firm—Antonelli, Terry Stout & Kraus

[57] ABSTRACT

A switching system for handling a plurality of cells, each cell including a header section and a data section, and for exchanging a communication message contained in the data section of the cell between a plurality of incoming highways and a plurality of outgoing highways according to the data contained in the header section of the cell. The switching system includes a unit for multiplexing the incoming highways in time division, a first memory having addressable storage locations for storing cells received from the multiplexing unit, a unit for demultiplexing and distributing data output from the first memory among a plurality of outgoing highways, a second memory for storing an empty address of an empty storage location of the first memory, a unit for controlling the write and read operations of the first memory in accordance with an empty address stored in the second memory used as write and read addresses, and a unit for detecting an error in at least one of the write address and read address.

36 Claims, 15 Drawing Sheets

| INPUT | | | OUTPUT | (SELECTED CLASS) |
|---|---|---|---|---|
| Q1 | Q2 | Q3 | | |
| 1 | X | X | 0 0 | (C1) |
| 0 | 1 | X | 0 1 | (C2) |
| 0 | 0 | 1 | 1 0 | (C3) |
| 0 | 0 | 0 | 1 1 | (IDLE) |

SWITCHING SYSTEM FOR SWITCHING CELLS HAVING ERROR DETECTION APPARATUS

CROSS-REFERENCE TO RELEVANT PATENT APPLICATIONS

The present application is relevant to U.S. application Ser. No. 96,011 filed Sept. 14, 1987 entitled "Time-division Channel Arrangement" in the name of Y. Sakurai et al, U.S. application Ser. No. 218,217 filed on July 13, 1988 now U.S. Pat. No. 4,910,731 and entitled "Switching System and Method of Construction Thereof" in the name of Y. Sakurai et al, and U.S. application Ser. No. 382,419 filed on July 20, 1989 now U.S. Pat. No. 4,956,839 and entitled "ATM Switching System" in the name of Y. Torii et al.

BACKGROUND OF THE INVENTION

The present invention relates to a switching system for performing switching of time-division/ multiplex communication information such as voice and data by using fixed length cells each having a header for routing, and more particularly to a switching system suitable for integrated switching of line switched information, such as voice, and burst switched information such as data.

The advent of a flexible and economical switching system has been desired which can perform integrated handling of communications having various bit rates including a bit rate (64 Kb/s) of typical telephone quality voice as well as a low bit rate (several 100 b/s) of data and a high bit rate (several Mb/s) of video signal, and various properties (such as burst nature and real time nature).

A prospective method which might meet the above desire is one wherein fixed length cells each having a header containing information for routing are used and all pieces of information are subjected to uniform switching. Such a proposal has already been made by the present applicant as exemplified in a switching system disclosed in a literature entitled "A Study on an Integrated Switching Network", National Convention Record in commemoration of the 70th anniversary of the foundation of The Institute of Electronics, Information and Communication Engineers of Japan, 1987, switching division 1832. In this example, all pieces of communication information are transferred by using fixed length blocks called cells. In switching the cells, a header-driven space-division switch is foundamentally used wherein the time switching function is provided for individual incoming highways in order to avoid collision between a plurality of cells destined for the same destination within the space-division switch. Further, the time switching function is assisted by the provision of a memory for switching and a buffer memory for queuing in order that two modes can be handled of which one is a line switched mode for, for example, a telephone quality voice requiring real time nature and the other is a burst switched mode for transmitting data generated in burst fashion and permitted to be delayed to a certain extent. While a cell for the line switched mode is preferentially handled without being passed through the buffer memory to insure the real time nature, a cell for the burst switched mode undergoes queuing at the buffer memory and is processed when a time slot is idle.

As another example, "TDM Switching System" disclosed in JP-A-59-135994 may be referred to. In this example, the concept of handling communications having the two kinds of properties, the line switched mode and the burst switched mode, is not clearly described but this example has the function of switching fixed length cells on time basis by using a buffer memory. In this case, the same buffer memory is used for queuing and switching of the cells. For realization of queuing, cells are written in the buffer memory at write addresses which can be known from headers. Queuing means are provided for storing the cells in accordance with destinations.

When switching is effected using fixed length cells, due to the fact that destinations of the individual cells are not always distributed uniformly, it happens that cells destined for the same destination are concentrated at a time, resulting in a congestion condition or the memory overflows and cells are lost. In the first mentioned literature by the present applicant, buffer memories for queuing are provided in association with different destination outgoing highways for the sake of avoiding the congestion condition. Such buffer memories are required to store all of cells involved and to store so many cells that overflow does not occur, and besides they must be provided in association with the individual destinations. Accordingly, this construction faces a problem that many memories are needed. On the other hand, in the second mentioned switching system (JP-A-59-135994), a single buffer memory is provided for all the incoming highways and a plurality of queuing units for storage of addresses on the buffer memory are provided in association with individual destinations of cells. With this construction, the localization of destinations of cells can be absorbed by a relatively small number of memories. However, the write address for the buffer memory is used periodically, leading to a theoretically equivalent state that the buffer memory is fixedly divided to correspond to the individual destinations with the result that when queuing in a certain queue exceeds a predetermined amount, the same write address is again used in spite of the fact that cells which have not been read out yet remain, causing overwriting in the buffer memory. In this event, a cell subject to overwriting is erased accidentally.

To solve the above problems, Japanese patent application No. 63-102512 (corresponding to U.S. application Ser. No. 218217) proposes a switching system wherein a plurality of incoming highways are multiplexed to write cells in a single common main buffer, cells destined for outgoing highways are read out of the main buffer in the order of the outgoing highways and the read-out cells are demultiplexed and distributed to the plurality of outgoing highways. Used in buffering control of this main buffer are a FIFO (First-in First-out) buffer memory standing for an idle address buffer memory (hereinafter referred to as an idle address FIFO), a write register and a read register which are provided in association with the individual outgoing highways, and a next or succeeding address on the main buffer subjected to read/write at the same address as that for a cell concurrently with read/write of the cell. A cell stored in the main buffer and destined for a particular outgoing highway is subjected to buffering control of the type of a chain which starts at an address indicated by the read register, uses an address written next to the indicated address as a next or succeeding address, and ends at an address indicated by the write register. Thus, when a cell to be delivered to a particular outgoing highway is desired to be read out of the main buffer, the cell at an address indicated by a read register associated with the particular outgoing highway is read out of the main buffer together with a succeeding address, the cell is demultiplexed and delivered to the particular outgoing highway, and the succeeding address is written in the read register and that address which has been written in that read register to precede that succeeding address is sent as an empty or idle address to the idle address FIFO. On the other hand, when a cell to be delivered to a particular outgoing highway is desired to be written in the main buffer, the cell is written at an address indicated by a write register associated with the particular outgoing highway. At that time, an address generated from the idle address FIFO is written, as a succeeding address, in the main buffer at the same address as the indicated write address concurrently with writing of the cell and also in that write register. Through the above operation, a chain for each outgoing highway is updated.

With the switching system constructed as above, when a cell arriving at the system is written in the main buffer, an empty or idle address is generated from the single idle address FIFO regardless of an outgoing highway for which the cell is destined so that the cell can be written in the main buffer at any address as far as the main buffer is empty. If destinations of incoming cells are localized at a particular outgoing highway, the number of cells destined for other outgoing highways is decreased correspondingly and the capacity required of the main buffer remains unchanged.

Further, an address at which a cell is stored is not returned to the idle address FIFO before reading of the cell is completed and therefore, advantageously, overwriting of a new cell at the same address and consequent loss of an old cell stored thereat can be prevented.

SUMMARY OF THE INVENTION

In the switching system disclosed in the aforementioned U.S. application Ser. No. 218,217, no consideration is given to the detection of an error due to a certain cause taking place in the write address or read address for the main buffer.

Further, in buffering of the type of a chain wherein addresses on the main buffer are related to each other so that cells destined for each outgoing highway may be read out of the main buffer in accordance with a predetermined order of address, an error due to a certain cause takes place, causing so-called address chain-breaking. The above US application also fails to consider such chain-breaking and once chain-breaking occurs for a certain cause, a resulting fault can not be cured automatically.

Particularly, in chain buffering wherein upon storage of a cell in the main buffer, an address for storage (reading) of the subsequently incoming cell destined for the same outgoing highway as that of the preceding cell, that is, the next or succeeding address is stored concurrently, the occurrence of the chain-breaking can not be detected.

An object of the invention is to provide a switching system capable of automatically detecting an error in the write or read address for the main buffer.

Another object of the invention is to provide a switching system capable of automatically detecting a occurrence of the chain-breaking and curing the same.

According to the invention, to accomplish the object, a switching system for handling a plurality of cells, each cell including a header section and a data section, and for exchanging a communication message contained in the data section of the cell between a plurality of incoming highways and a plurality of outgoing highways according to the data contained in the header section of the cell, comprises a unit for multiplexing the incoming highways in time division, a first memory having addressable storage locations for storing cells received from the multiplexing unit, a unit for demultiplexing and distributing data output from the first memory among a plurality of outgoing highways, a second memory for storing an empty address of an empty storage location of the first memory, a unit for controlling the write and read operations of the first memory in accordance with an empty address stored in the second memory used as write and read addresses, and a unit for detecting an error in at least one of the write address and read address.

According to the invention, more particularly, in a switching system having a plurality of incoming highways and a plurality of outgoing highways, a main buffer for storing cells received from the incoming highways, a write register and a read register which are provided in association with each outgoing highway, and a buffer memory for storing an empty address for the main buffer, wherein data is stored in the main buffer in unit of a record of a current cell and an address of a cell to be read subsequently, a read address for a record to be read in association with an outgoing highway and an address for a new record are stored in the read register and the write register, respectively, and buffering of the type of a chain associated with each outgoing highway is effected which starts at the address stored in the read register and ends at the address stored in the write register, each record stored in the main buffer contains a cell, an identifier indicative of an outgoing highway to which the cell is to be delivered and an address of a cell to be read subsequently, and when one record is read out of the main buffer, in respect of an outgoing highway, on the basis of the address stored in the read register, an outgoing highway identifier in the record is compared with the outgoing highway to which the record is to be delivered.

When occurrence of a read error is detected through the comparison, the switching system is returned to the initial state or initialized. Alternatively, a unit for detecting that no cell to be read is present in the main buffer may be further provided so that the switching system can be initialized by an output signal of the detecting unit.

In accordance with the present invention, when a cell is read out of the main buffer in respect of an output highway, an outgoing highway number is read together with the cell to decide chain-breaking of cell, and if chain-breaking is detected, the entire switching system is initialized. Accordingly, in accordance with the invention, in the event that a chain-breaking fault occurs in the main buffer and a chain to be in association with a given output highway is connected to a different output highway chain, the chain-breaking can be detected immediately at the time that the cell is read out of the main buffer, thereby expediting cure of the fault.

DESCRIPTION OF THE PREFERRED EMBODIMENTS

Preferred embodiments of a switching system according to the invention will now be described with reference to the accompanying drawings.

Figure 1:
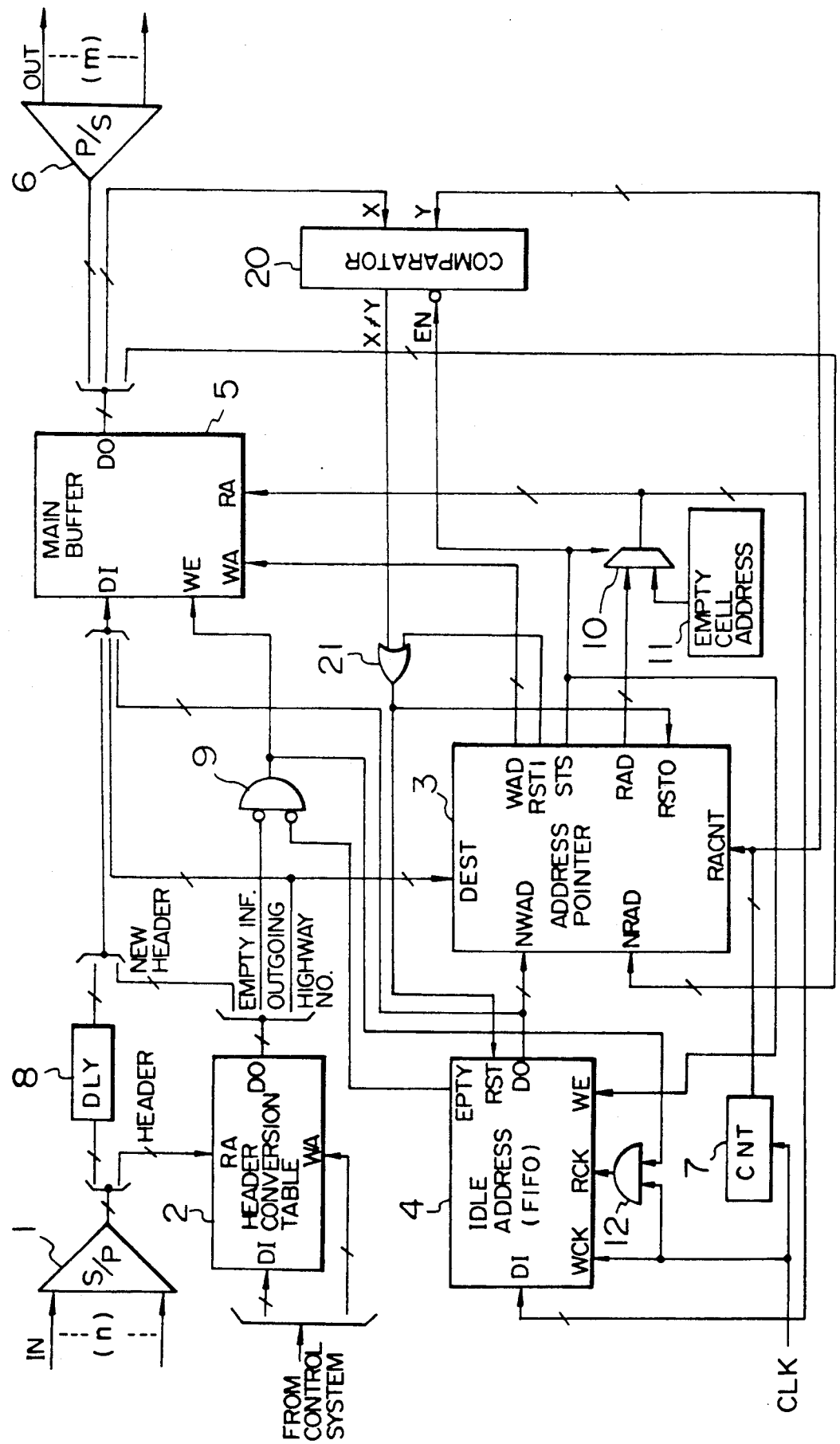
FIG. 1 is a block diagram illustrating the construction of a switching system according to an embodiment of the invention.

FIG. 1 illustrates an embodiment of the switching system of the invention. Referring to FIG. 1, n incoming highways IN are coupled to a data input (DI) of a main buffer 5 through a serial/parallel conversion and multiplexing circuit 1 and a data output (DO) of the main buffer 5 is coupled to a parallel/serial conversion and demultiplexing circuit 6 so that output data is demultiplexed into m outgoing highways OUT. The output signal of the serial/parallel conversion multiplexer 1 has a cell having a field or section of header which is coupled to a read address terminal (RA) of a header conversion table 2. An output signal from data output (DO) of the header conversion table 2 has a field or section of new header coupled to the data input of the main buffer 5, a field or section of idle/busy information (idle or empty=0) coupled to a write enable input (WE) of the main buffer 5 through an AND gate 9, and a field or section of outgoing highway number coupled to the data input (DI) of the main buffer 5 and to a destination outgoing highway number input (DEST) of an address pointer 3.

The header conversion table 2 also has a data input (DI) and a write address input (WA) which are coupled to a control system not shown. An idle address FIFO 4 has a data output (DA) coupled to the data input (DI) of the main buffer 5 and a next write address input (NWAD) of the address pointer 3, and an empty display output (EPTY) coupled to the write enable input (WE) of the main buffer 5 through the AND gate 9. The address pointer 3 also has a write address output (WAD) coupled to a write address input (WA) of the main buffer 5, and a read address output (RAD) coupled to a red address input (RA) of the main buffer 5 and to a data input (DI) of the idle address FIFO 4 exemplifying a buffer memory of idle address, through a selector 10.

An output signal from the data output (DO) of the main buffer 5 has a field of next read address connected to a next read address (NRAD) of the address pointer 3, and another field corresponding to a cell body or cell per se is demultiplexed and delivered to a corresponding outgoing highway through the parallel/serial conversion demultiplexer 6. This output signal also has a field of outgoing highway number connected to one input of a comparator circuit 20. A control counter 7 has an output coupled to a read counter input (RACNT) of the address pointer 3 and the other input of the comparator circuit 20. An empty address register 11 is coupled to one input of the selector 10. The address pointer 3 also has a queue state display output (STS) coupled to a selection input of the selector 10 and a write enable input (WE) of the idle address FIFO 4. A reset output (RST1) of the address pointer 3 is coupled to a reset input (RSTO) thereof and a reset input (RST) of the idle address FIFO 4 through an OR gate 21. The comparator circuit 20 has an output which assumes "1" when the two input signals are not coincident or unmatch with each other and which is coupled to the reset input (RST0) of the address pointer 3 and the reset input (RST) of the idle address FIFO 4 through the OR gate 21.

Firstly, the operation of writing a cell in the main buffer will be described.

Figure 2:
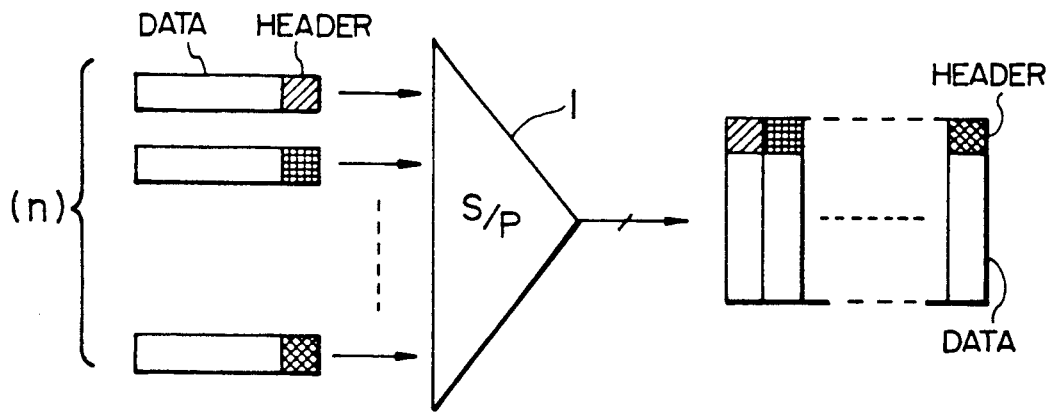
FIG. 2 is a diagram useful to explain the operation of a serial/parallel conversion and multiplexing circuit 1 the FIG. 1 system.
Figure 3A:
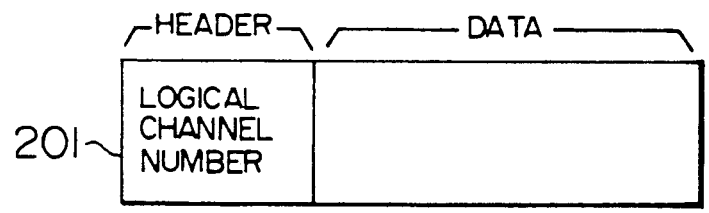
FIGS. 3A-3C are diagrams for explaining the structure of a cell used in the FIG. 1 system.
Figure 3B:
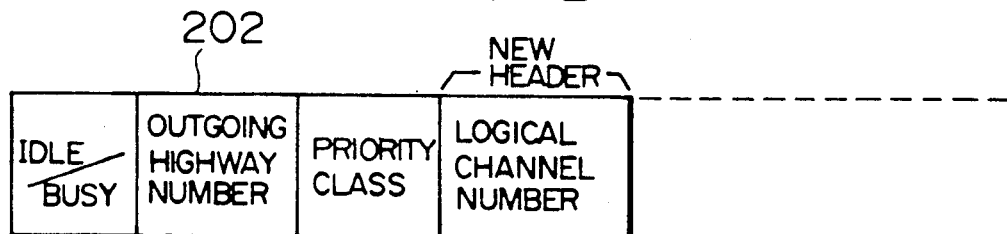

Cells coming from each incoming highway are subjected to serial to parallel conversion at the serial/parallel conversion multiplexer 1, thereby making it easy to handle the cells sequentially one by one. The concept of the serial/parallel conversion multiplexing is diagrammaticaly shown in FIG. 2 and an example of structure of a cell coming from an incoming highway is shown in FIG. 3A. The serial/parallel conversion multiplexer 1 may be constructed of a known circuit generally called a barrel shifter. As shown in FIG. 3A, described in the header of the cell is a logical channel number for accessing the header conversion table 2 which in turn produces a new logical channel number on the outgoing highway side associated with the cell, information indicating whether the cell is empty or busy, and an outgoing highway number for which the cell is destined. Upon call set-up, the control system accesses the above kinds of information to write the same in the table. FIG. 3B shows an example of the output signal of the header conversion table 2.

The destination outgoing number of the cell is supplied to the address pointer 3 which in turn delivers a write address corresponding to the destination outgoing highway number. The write address has been fed in advance from the idle address FIFO 4 to the address pointer 3. Under the direction of this write address, the cell is written in the main buffer 5. It is to be appreciated that when the input cell is an empty cell or the idle address FIFO is idle (in other words, when no empty address is present in the main buffer), the AND gate 9 is rendered to provide "L" output, thus preventing the cell from being written in the main buffer 5. At that time, a read clock (RCK) of the idle address FIFO 4 also receives the "L" signal and no empty address is delivered out of the FIFO 4.

Next, the operation of reading the cell will be described. IN order to read the cell, a read address is obtained from the address pointer 3 in accordance with a number generated from the control counter 7 and the thus obtained address is used as a read address for the main buffer. The numerical value from the control counter corresponds to the outgoing highway number. Therefore, cells are read out one by one in sequence in respect of each outgoing highway. The address which has been used as the read address is sent to the data input (DA) of the idle address FIFO 4 and is again used as a read address. It is to be appreciated that when there is no cell destined for a particular outgoing highway in the main buffer, a queue state display output signal (STS) is delivered to cause the selector 10 to select, as a read address for the main buffer 5, an address stored in the empty cell address register 11. The contents of the main buffer corresponding to this address constantly remains to be an empty cell.

The data output signal (DO) from the idle address FIFO 4 is stored, together with the cell, in the main buffer, in order to ensure that a storage address for a succeeding cell (next address) to be delivered to the same destination outgoing highway as that for a preceding or current cell can be indicated. This operation will be detailed later with reference to FIG. 4.

The outgoing highway number at the data output (DO) of the header conversion table 2 is stored, together with the cell, in the main buffer, in order to ensure that in the event that the succeeding address in the main buffer is an erroneous address due to a fault such as an error in software and consequently impertinent data is read out of the main buffer, this incorrect state can be found and cured. The present invention features a countermeasure against this fault which will be described later with reference to FIGS. 6 and 7.

Figure 3C:
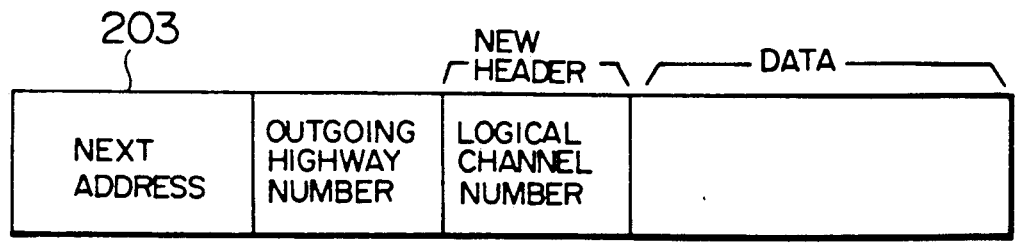

FIG. 3C shows a structure of a cell in the main buffer.

Figure 4:
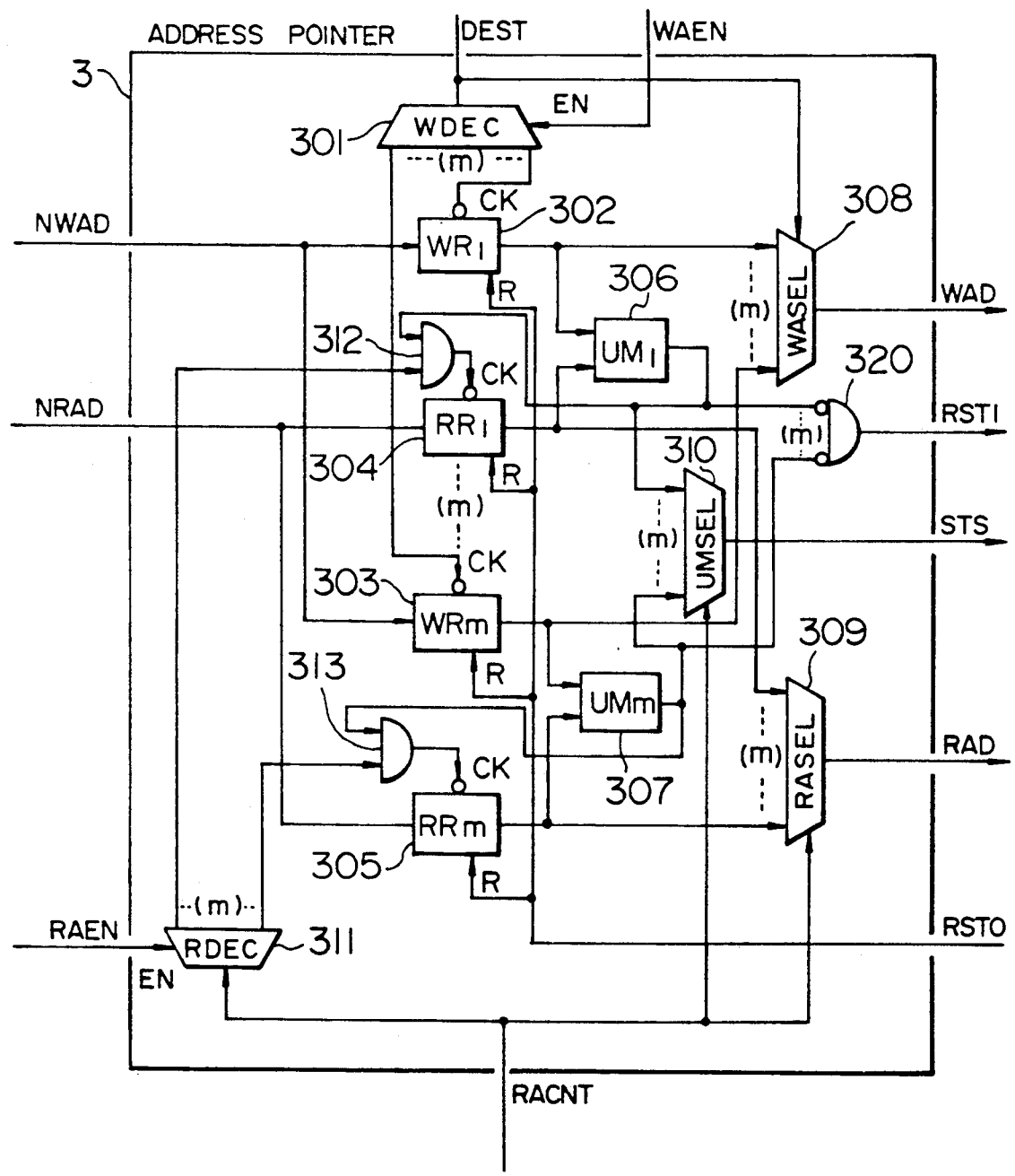
FIG. 4 is a functional block diagram illustrating an embodiment of an address pointer 3 in the FIG. 1 system.

Referring now to FIG. 4, the construction and operation of the address pointer 3 will be described. The outgoing highway number input (DEST) is coupled to the input of an outgoing highway number decoder 301 and the selection input of a write address selector 308. The outgoing highway number decoder 301 has m output lines respectively connected to clock inputs of m write registers (WR1-WRm) 302-303. The next write address signal (NWAD) supplied from the external idle address FIFO 4 is applied to inputs of the write registers and output signals of the individual write registers are delivered through the write address selector 308 so as to provide a write address output signal (WAD).

On the other hand, the control counter input (RACNT) is coupled to a decoder 311 and a selection input of an address selector 309, and m decode outputs of the decoder 311 are respectively coupled to clock inputs of m read registers (RR1-RRm) 304-305 through gates 312-313. The next read address input signal (NRAD) supplied externally is applied to inputs of the read registers and output signals of the individual read registers are delivered through the read address selector 309 so as to provide a read address signal (RAD). Non-coincidence or unmatch detectors 306-307 are respectively connected to receive output signals from associated write registers and read registers and output signals of the individual non-coincidence or unmatch detectors are delivered through a non-coincidence or unmatch information selector 310 so as to provide a queue state display output signal (STS). The output signals of the non-coincidence detectors are also connected to one input of the respective gates 312-313. Further, the output signals of the non-coincidence detectors 306-307 are delivered through an AND gate 320 so as to provide a reset output signal (RST1). The reset input (RST0) is connected to initialization inputs (R) of the m write registers (WR1-WRm) 302-303 and m read registers (RR1-RRm) 304-305.

In accordance with an outgoing highway number input signal (DEST), one of m write register output signals which corresponds to the outgoing highway number is selected by the write address selector 308 to provide a write address output signal (WAD). At that time, a decode output signal of the outgoing highway number decoder 301 causes a value held in that write register to be updated to a (NWAD) value supplied from the idle address FIFO. Accordingly, an NWAD value immediately before updating corresponds to a write address for the succeeding input cell having the same destination as the destination outgoing highway number of the cell being about to be written at present. Therefore, by storing the NWAD value in the main buffer to provide the same record as the cell being about to be written presently, it can be known from which address the next cell destined for the same outgoing highway should be read when the above record is read later.

When reading a cell, a next read address read out of the main buffer is held in one of the read registers $RR_1$-$RR_m$ which is selected by the output of the decoder 311 and which produces a read address output signal (RAD) to be selected by the read address selector 309 receiving at its selection input a value from the control counter 7.

The AND gate 320 is a circuit adapted to produce a detection signal RST1 indicating that coincidence or matching obtained between the write register and read register associated with each of all the outgoing highways within the switch is detected or disappearance of all the cells within the main buffer 5 is detected, and the entirety of the switching system is initialized by this detection signal RST1. In the main buffer 5, buffering of chain type is carried out which starts at an address in a read register associated with each outgoing highway, traces the ensuing addresses in the main buffer 5 sequentially and ends at an address in the write register. Thus, in the event that the subsequent address in the main buffer 5 becomes erroneous owing to a fault and chain-breaking results, the main buffer 5 can be permitted to be again used after the above initialization is completed.

A reset input signal for initializing all the write registers and read registers is fed through the RST0 input of the address pointer 3. Resetting is done such that coincidence or matching is obtained between the write register and read register associated with each outgoing highway and different write registers for different outgoing highways are set with different values. For example, the write register WR1 and read register RR1 may be set with "0" and the write register WRm and read register RRm may be set with "m-1", indicating that a value of "(outgoing highway number)-1" may be set in the write and read registers.

Figure 5:
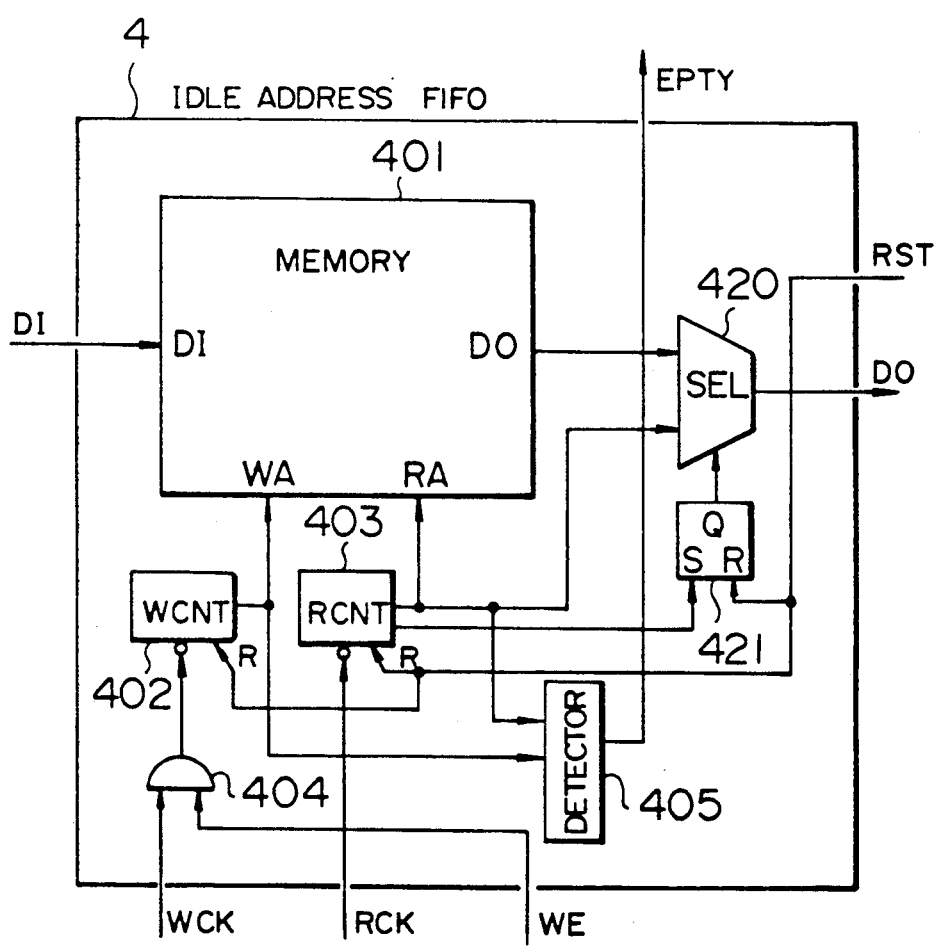
FIG. 5 is a functional block diagram showing details of an idle address FIFO 4 in FIG. 1.

FIG. 5 shows the construction of the idle address FIFO 4. As shown, the idle address FIFO 4 includes a memory 401, a write counter (WCNT) 402, a read counter (RCNT) 403, an AND gate 404, a coincidence or matching detector 405, a selector 420 and an SR flip-flop 421.

The write counter 402 is a counter for providing a write address (WA) and constructed of a ring counter capable of counting up the number of addresses on the memory 401. The read counter 403 is a counter for providing a read address (RA) and is also constructed of a ring counter capable of counting up the number of addresses on the memory 401. When values of the two counters are coincident or matching with each other, indicating that the memory becomes empty, the coincidence detector 405 detects this state to produce an empty output signal (EPTY). As is clear from the above, this construction has the FIFO function as a whole.

Initialization is carried out by resetting the SR flip-flop 421 under the command of an RST input signal, thereby causing the selector 420 to select the read counter 403. At that time, the write counter 402 is reset to 0 (zero). On the other hand, the read counter 403 is set with a value of m which is not used as initially set value by the write and read registers included in the address pointer 3. While counting up starting from the initially set value m, the read counter 403 provides an empty address to the NWAD input of the address pointer 3 and to a next address on the main buffer 5. When the read counter 403 reaches an upper limit and then returns to zero, indicating that initialization is completed, it sets the SR flip-flop 421 causing the selector 420 to pass a value on the memory 401 so that a data output signal (DO) is delivered out of the idle address FIFO 4.

The present invention features a method of detecting chain-breaking and the method will now be described below.

In FIG. 1, when a cell is written in the main buffer 5, an outgoing highway number is also written concurrently. Along with a cell, an outgoing highway number X is read out of the main buffer 5 and during normal operation, the read outgoing highway number equals a read outgoing highway number Y indicated by an output signal of the control counter 7. But when non-coincidence (X=Y) takes place between the two values, occurrence of chain-breaking due to a fault is determined and the comparator circuit 20 operates to reset (initialize) the address pointer 3 and idle address FIFO 4.

The operation of the chain-breaking detection will now be described with reference to FIG. 6. It is now assumed that an outgoing highway i constitutes a chain which starts at an address in a read register RRi, traces address A1, A3 and A6 and ends at an address in a write register WRi and that an outgoing highway j constitutes a chain which starts at an address in a read register RRj, traces addresses A2, A4 and A5 and ends at an address in a write register WRj. Under this condition, if an error causes a next address in the address A2 to change from A4 to A3, then, upon delivery of data to the outgoing highway j, reading of data at the address A2 from the main buffer is followed by reading of data at the address A3. In this event, while the read-out outgoing hgihway number is i, the data delivery operation is carried out for the outgoing highway of number j and in this phase of data delivery, the comparator circuit 20 operates to detect the chain-breaking error.

Figure 7A:
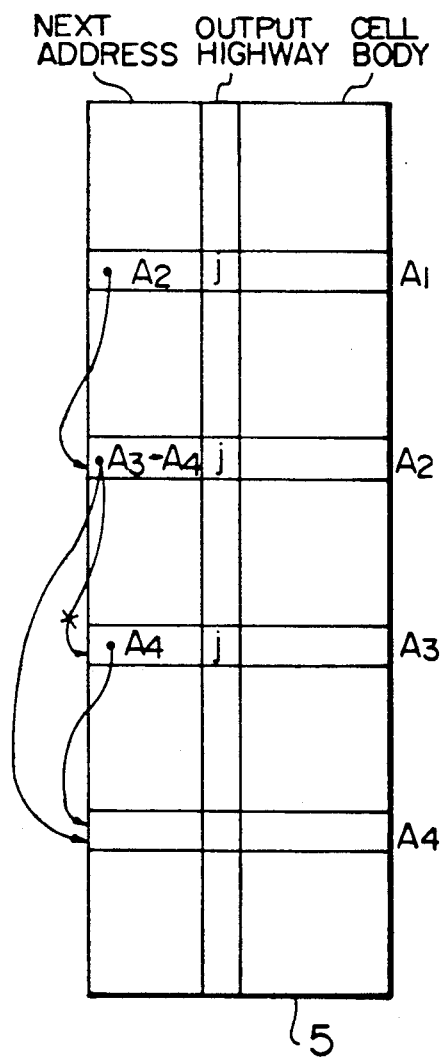
FIGS. 7A and 7B are diagrams useful to explain other modes of chain-breaking of cell address.

FIG. 7A shows a fault where in a chain tracing addresses A1, A2, A3 and A4 sequentially, a next address in the address A2 changes to A4 with the result that the address A3 is skipped. In this event, data is read in sequence of the addresses A1, A2, and A4 and data at the address A3 is skipped. As described previously, when it is decided that no cell to be read out is present in the main buffer 5, that is, when coincidence occurs between a write register and a read register which are provided in the address pointer 3 in association with each outgoing highway, the initialization is carried out and the area or storage location at which reading of data is skipped can again be used.

Figure 7B:
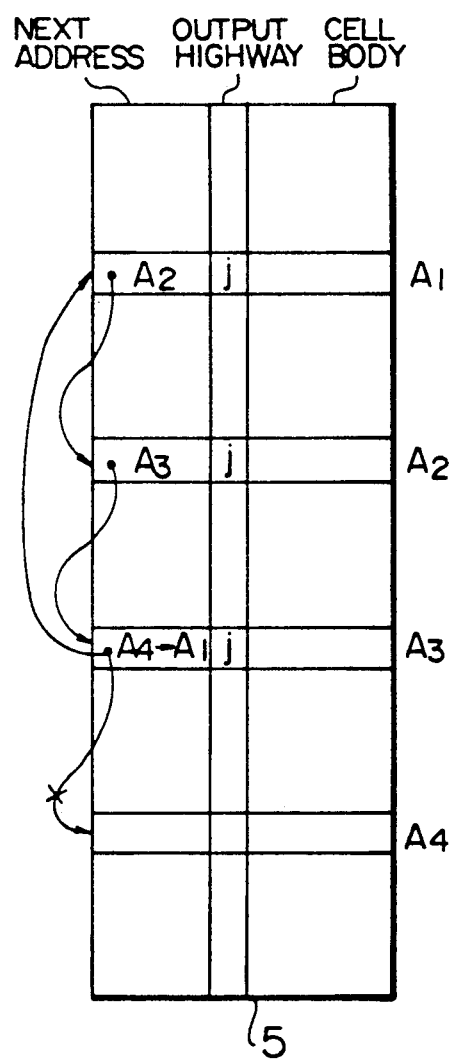

FIG. 7B shows a fault where in a chain tracing addresses A1, A2, A3 and A4 sequentially, a next address in the address A3 changes from A4 to A1 with the result that circulation through the addresses A1, A2 and A3 occurs. In this event, circulative delivery of cells at the addresses A1, A2 and A3 to an outgoing highway j is effected in this order. Then, each of the addresses A1, A2 and A3 is sent as used address to the idle address FIFO 4 each time that the respective addresses are read. In a while, each used address is supplied as an empty address from the idle address FIFO 4 to the address pointer 3 and used in another outgoing highway. Then, if one of the empty addresses is used in an outgoing highway i different from the outgoing highway j and a cell destined for the outgoing highway i is written in the one empty address, the outgoing highway number will be rewritten from j to i so that upon reading of the outgoing highway j, the outgoing highway number i is read and the chain-breaking can be found by the comparator circuit 20. Thus, once chain-breaking is caused, it can not be found at the first occurrence thereof but can be found at the second occurrence by means of the comparator circuit.

Figure 8:
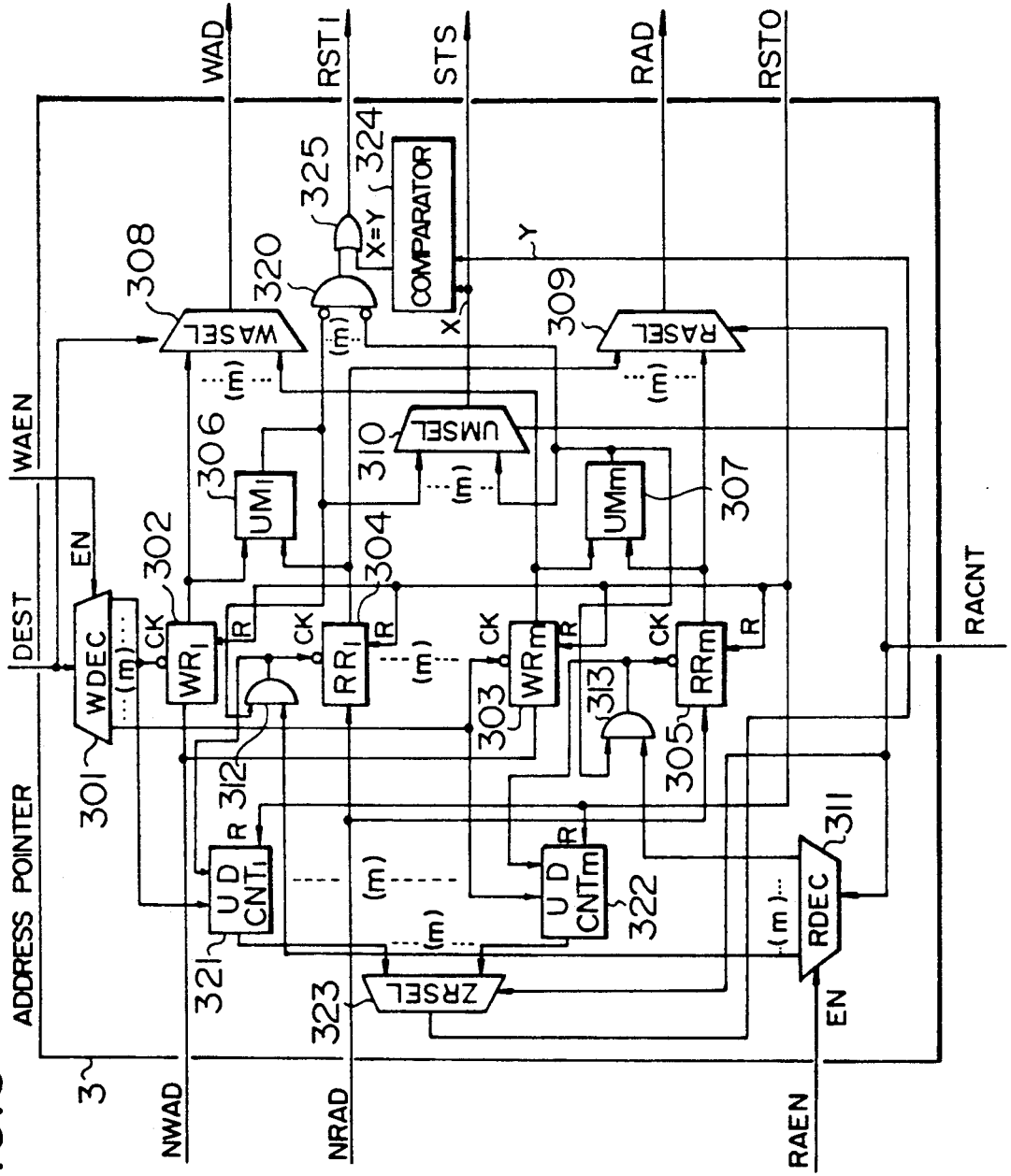
FIG. 8 is a functional diagram illustrating another embodiment of the address pointer 3 in FIG. 1.

FIG. 8 illustrates a second embodiment of the address pointer according to the invention. The FIG. 8 address pointer differs from the first embodiment of address pointer 3 shown in FIG. 4 by further including m up/down counters (CNT1-CNTm) 321-322, a selector 323, a comparator circuit 324 and an OR gate 325 which are dedicated to chain-breaking finding. Upon initialization, the up/down counters 321-322 are reset to "0" by a reset signal from the reset input RSTO. When a cell is written in the main buffer 5, an outgoing highway number decoder 301 counts up one of the up/down counters CNT1-CNTm which corresponds to an outgoing highway number of the cell. Then, when the cell is read out of the main buffer 5, a decoder 311 responds to a signal from the read outgoing highway number input RACNT to count down one of the up/down counters CNT1-CNTm which corresponds to the outgoing highway number of the read-out cell. Accordingly, each of the up/down counters 321-322 indicates the number of cells stored in the main buffer 5 in respect of each outgoing highway so that when the value of an up/down counter associated with a given outgoing highway is "0", indicating that coincidence occurs between a write register and a read register which are provided in association with that outgoing highway, that up/down counter value opposes an output signal "1" of corresponding one of non-coincidence circuits 306-307 (UM-1-UMm) in the absence of chain-breaking. The "0" output signal of the one of the up/down counters 321-322 which is selected by the read outgoing highway number signal (RACNT) and the output signal of the corresponding one of the non-coincidence circuits 306-307 are supplied to the comparator circuit 324 through the selector 323 and a selector 310, respectively, whereby non-coincidence between the two input signals to the comparator circuit 324 is confirmed. If coincidence occurs between two input signals to the comparator circuit 324, chain-breaking is decided to be present and the comparator circuit 324 delivers a reset signal "1" to the reset output (RST1) through the OR gate 325, thereby effecting initialization operation.

The coincidence between two input signals to the comparator 324 in FIG. 8 takes place in the even that the fault shown in FIG. 7A or FIG. 7B is caused. Given that in the example of FIG. 7A, the read register and write register associated with the outgoing highway j designate or indicate addresses A1 and A4, respectively. Then, because of three cells stored at addresses A1, A2 and A3, an up/down counter associated with the outgoing highway j indicates 3. On the assumption that during reading of the cells for the outgoing highway j from the main buffer 5, no cell is written therein, the values of the write and read registers coincide with each other by taking the address A4 because of the chain-breaking occurring before reading of the two cells at that addresses A1 and A2 is completed. Accordingly, the output signal of the corresponding non-coincidence circuit is "0" and the selector 310 delivers a "0" output signal. Now, the non-coincident circuit delivers a "1" output signal when the values of the write and read registers coincide to each other. At that time, however, the up/down counter decreases its value by only 2 to take "1" and the selector 323 delivers a "0" output signal. Accordingly, two input signals to the comparator circuit 324 coincide with each other and the chain-breaking is detected by the comparator circuit 324. Now, the selector 323 delivers a "1" output when a value of one of the counters CNT selected by the signal RACNT is "0" and delivers a "0" output when the value is other than "0". Turning to the fault shown in FIG. 7B, given that the read register and write register associated with the outgoing highway j indicate addresses A1 and A4, respectively, an up/down counter indicates 3. On the assumption that during reading of cells from the main buffer, no cell to be written reaches, the value of the up/down counter becomes "0" and the selector 323 delivers a "1" output signal at the time that all of the cells at the addresses A1, A2, and A3 are read out. However, because of the chain-breaking the read register indicates the address A1 and the write register indicates the address A4 and the values of the two registers do not coincide with each other. Accordingly, the output signal of the corresponding non-coincidence circuit becomes "0" and coincidence occurs between two input signals to the comparator circuit, thereby ensuring that the chain-breaking can be detected by the comparator circuit.

The scheme shown in FIG. 8 in which the up/down counters are provided in association with individual outgoing highways is for detecting the chain-breaking by checking the outgoing highway number read out of the main buffer and is effective for rapid detection of chain-breaking when in spite of unexpected coincidence of the outgoing highway number, the chain-breaking can not otherwise be found.

Figure 9:
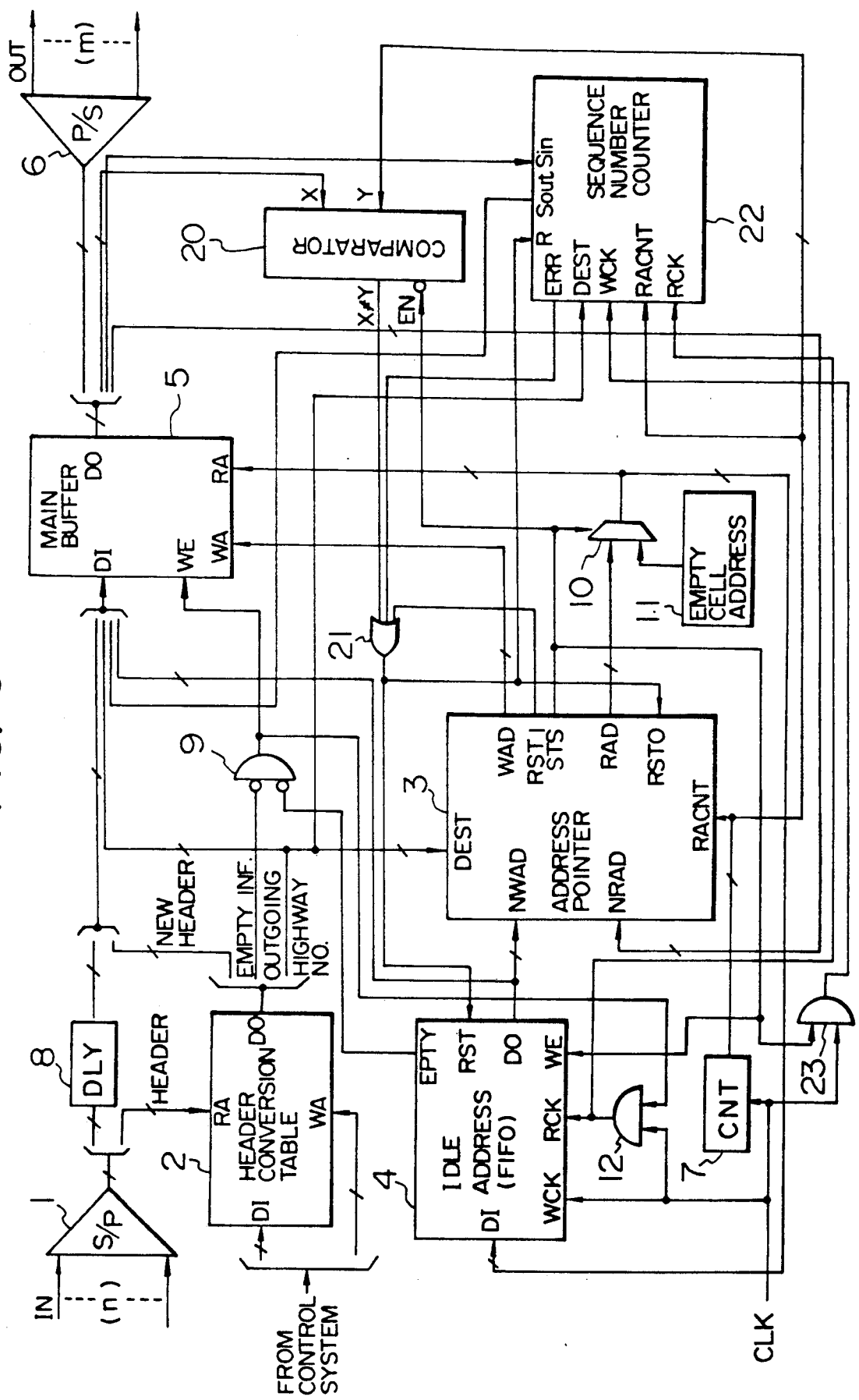
FIG. 9 is a block diagram illustrating a switching system according to another embodiment of the invention.
Figure 10:
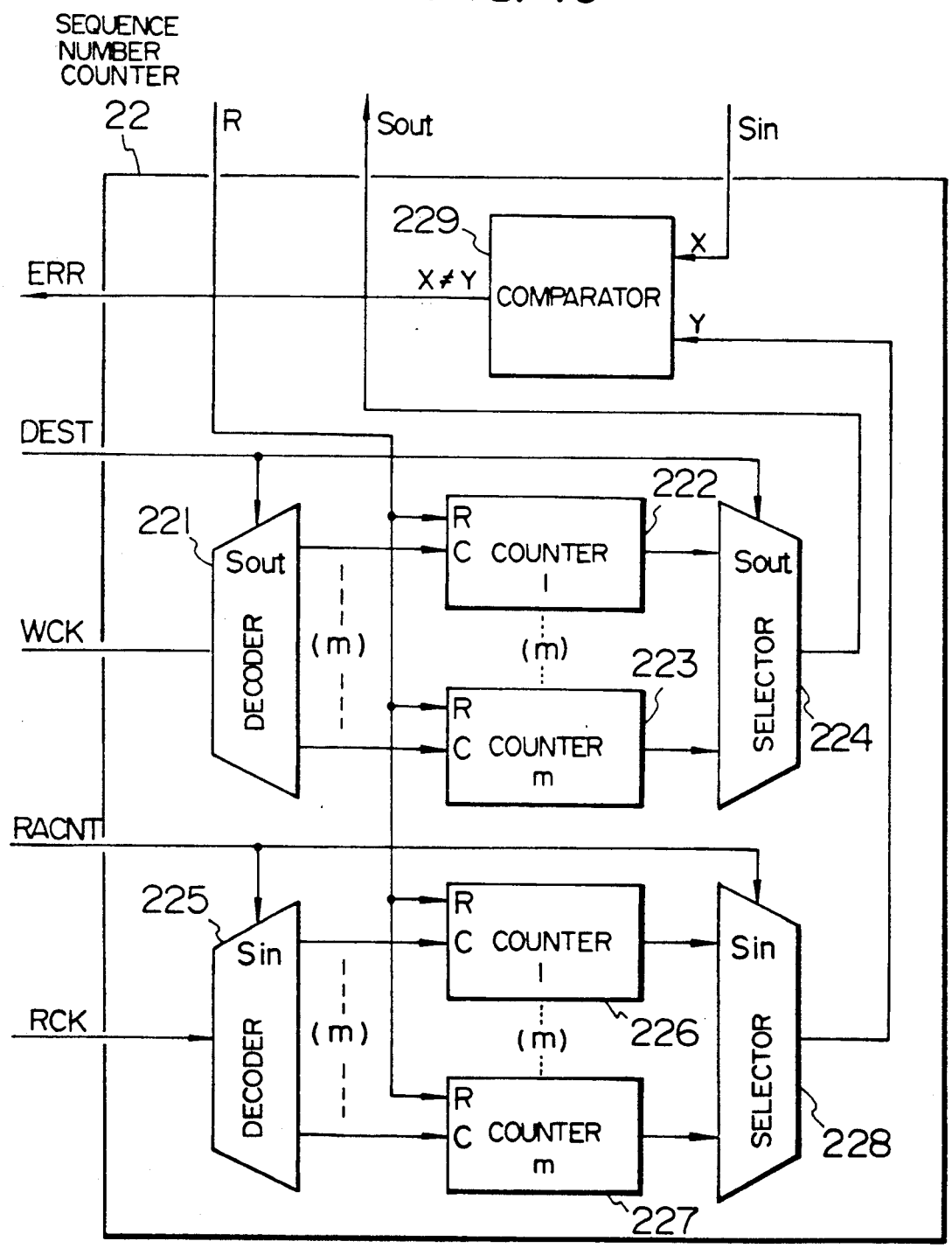
FIG. 10 is a block diagram showing details of a sequence number/counter 22 in FIG. 9.

FIG. 9 illustrates the overall construction of a switching system according to a second embodiment of the invention. This embodiment adds to the FIG. 1 construction a sequence number counter 22 and an AND gate 23 for the purpose of achieving more rapid detection of chain-breaking. As shown in FIG. 10, the sequence number counter 22 has write sequence counters 222-223 in association with individual outgoing highways and read sequence number counters 226-227 also associated with the individual outgoing highways. Upon writing of a cell in a main buffer 5, its outgoing highway number is supplied to a DEST input of the sequence number counter 22. Further, a write sequence number counter corresponding to that outgoing highway number is selected by a selector 224 and a sequence number delivered through an output Sout is written, along with the cell, in the main buffer. At that time, a CLK signal and a queue state display output signal (STS) from an address pointer 3 are ANDed at the AND gate 23 to provide a write clock signal applied to a WCK input of the sequence number counter 22 so as to count up, through a decoder 221, the write sequence number counter for the outgoing highway number designated by the DEST signal. In this manner, cells for each outgoing highway are assigned with sequence numbers in the same sequence as that of writing the cells in the main buffer 5.

When reading a cell from the main buffer 5, its sequence number is read concurrently and fed to a sequence number input (Sin) of the sequence number counter 22. At that time, a read outgoing highway number output signal from a control counter 7 is applied to a RACNT input of the sequence number counter 22 so that a selector 228 selects a read sequence counter corresponding to the outgoing highway. A comparator circuit 229 is for checking coincidence between the two sequence numbers. When non-coincidence is detected and occurrence of chain-breaking is determined, the comparator circuit produces a reset signal for initialization which is delivered through an EER output and supplied through an OR gate 21 to an address FIFO 4, an address pointer 3 and the sequence number counter 22 so as to reset the same.

The read sequence number counter selected by the RACNT outgoing highway number signal upon reading of the cell is counted up by a RCK signal applied through a selector 225 and updated to take the next sequence number.

With this scheme, in the event of occurrence of the chain-breaking shown in FIG. 7A or 7B, the order of the sequence number is disturbed and therefore the chain-breaking can be found rapidly to advantage. Conceivably, chain-breaking will take place wherein coincidence of the order of the sequence number is maintained. Even such chain-breaking, however, can be detected by generating the same number of sequence numbers as that of addresses in the main buffer 5 or of storable cells so that the order of the sequence number may be disordered without fail in the presence of the chain-breaking, thus improving accuracy of chain-breaking detection.

Figure 11:
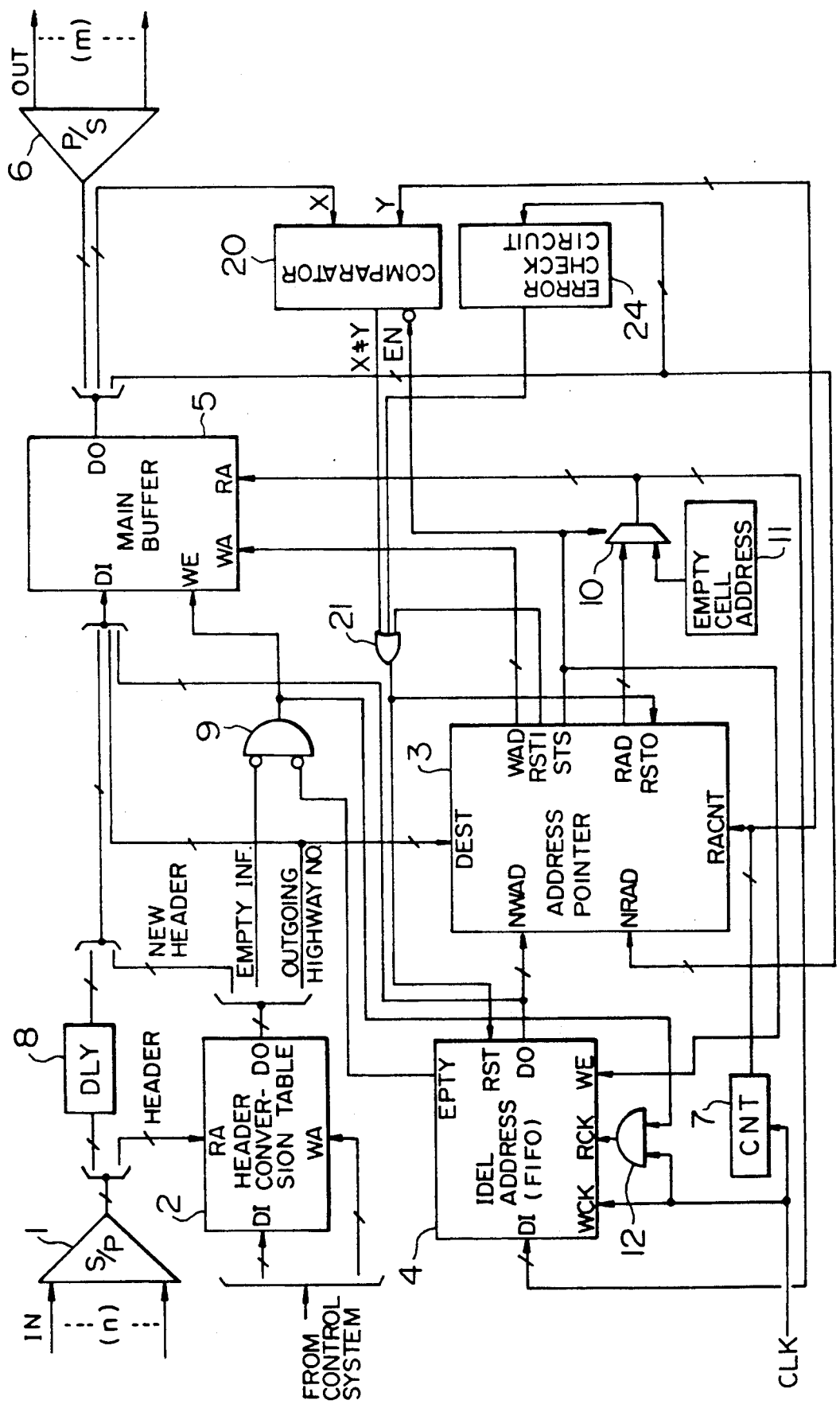
FIG. 11 is a block diagram illustrating a switching system according to still another embodiment of the invention.
Figure 12:
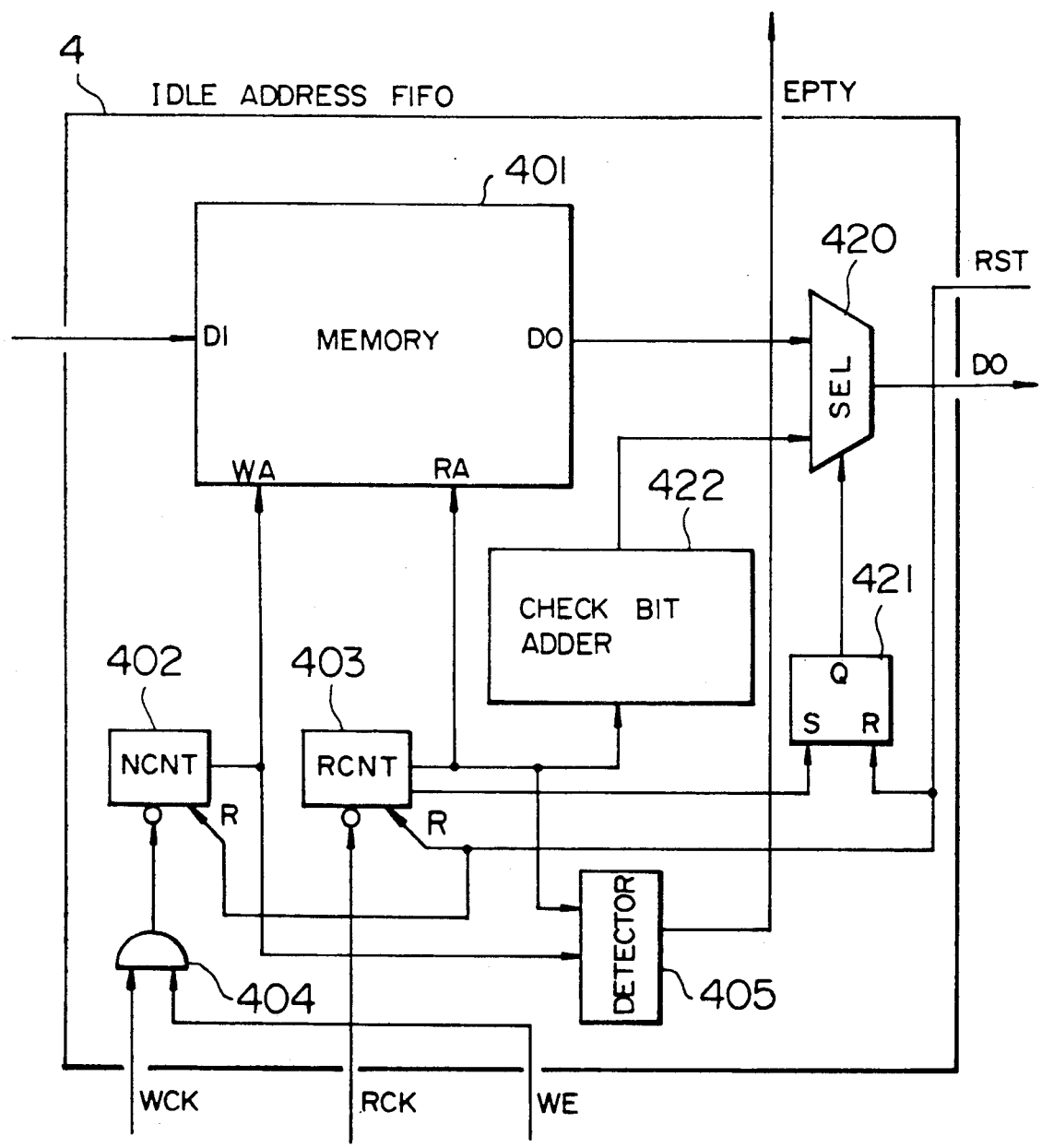
FIG. 12 is a functional block diagram showing details of an idle address FIFO 4 in FIG. 11.

FIG. 11 illustrates the overall construction of a switching system according to a third embodiment of the invention, wherein an error check circuit 24 is added to the FIG. 1 construction. An idle address FIFO 4 in this embodiment includes a check bit adder 422 as shown in FIG. 12 in order that an empty address generated from a read counter 403 during initialization is added with a check bit such as parity and delivered as a data output signal (DO). Accordingly, an address on a main buffer 5 used in the FIG. 11 embodiment is always added with a check bit. Thus, when an address necessary for the chain buffering operation is read out of the main buffer 5, a check bit at the succeeding address can be used to check an error, thereby detecting chain-breaking. The error check circuit 24 checks the error at the succeeding address and when detecting the error, it initializes the idle address FIFO 4 and an address pointer 3.

In accordance with this scheme, double checking can be carried out including outgoing highway number check upon reading of a cell from the main buffer and succeeding address error check and therefore even chain-breaking undetectable by only outgoing highway number check can be detected. When the outgoing highway number check is omitted and only the succeeding address error check is realized upon, chain-breaking undetectable by the succeeding address error check can never be detected unless an error is caused subsequently at the succeeding address.

Figure 13:
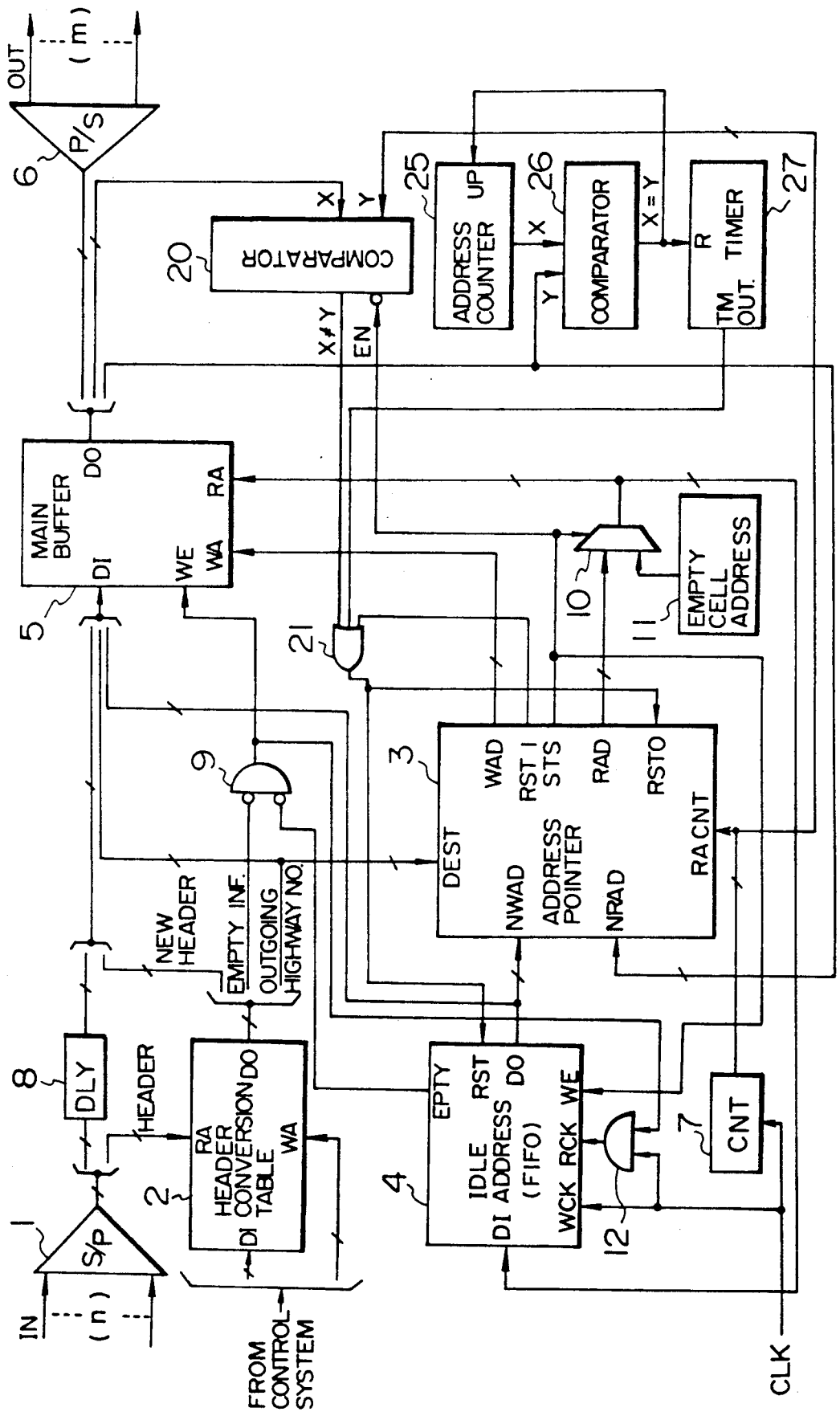
FIGS. 13 and 14 are block diagrams illustrating switching systems according to further embodiments of the invention.

FIG. 13 illustrates the overall construction of a switching system according to a fourth embodiment of the invention which adds to the FIG. 1 construction an address counter 25, a comparator 26 and a timer 27. Individual addresses on a main buffer 5 are used and thereafter sent to an idle address FIFO 4 so as to be again used each time a cell to be written reaches. Accordingly, each address is either stored in the main buffer 5 as a next address or stored in the idle address FIFO 4 as an empty address and can be observed and found without fail when the succeeding address is read out of the main buffer 5. Thus, an address generated from the address counter 25 is compared at the comparator circuit 26 with the succeeding address read out of the main buffer 5. If coincidence occurs, the timer 27 is reset and the address counter 25 is counted up to update the address. When a specified address from the main buffer 5 can not be detected because of chain-breaking, the timer 27 provides a time-over signal which is supplied through an OR gate 21 to an address pointer 3 so as to initialize the same.

When chain-breaking occurs in the fault of FIG. 7A, the address A3 is not generated from the main buffer 5. In the case of FIG. 7B fault, the address A4 is not generated. Even in such an event, the provision of the address observation unit as shown in FIG. 13 can permit detection of chain-breaking.

Figure 14:
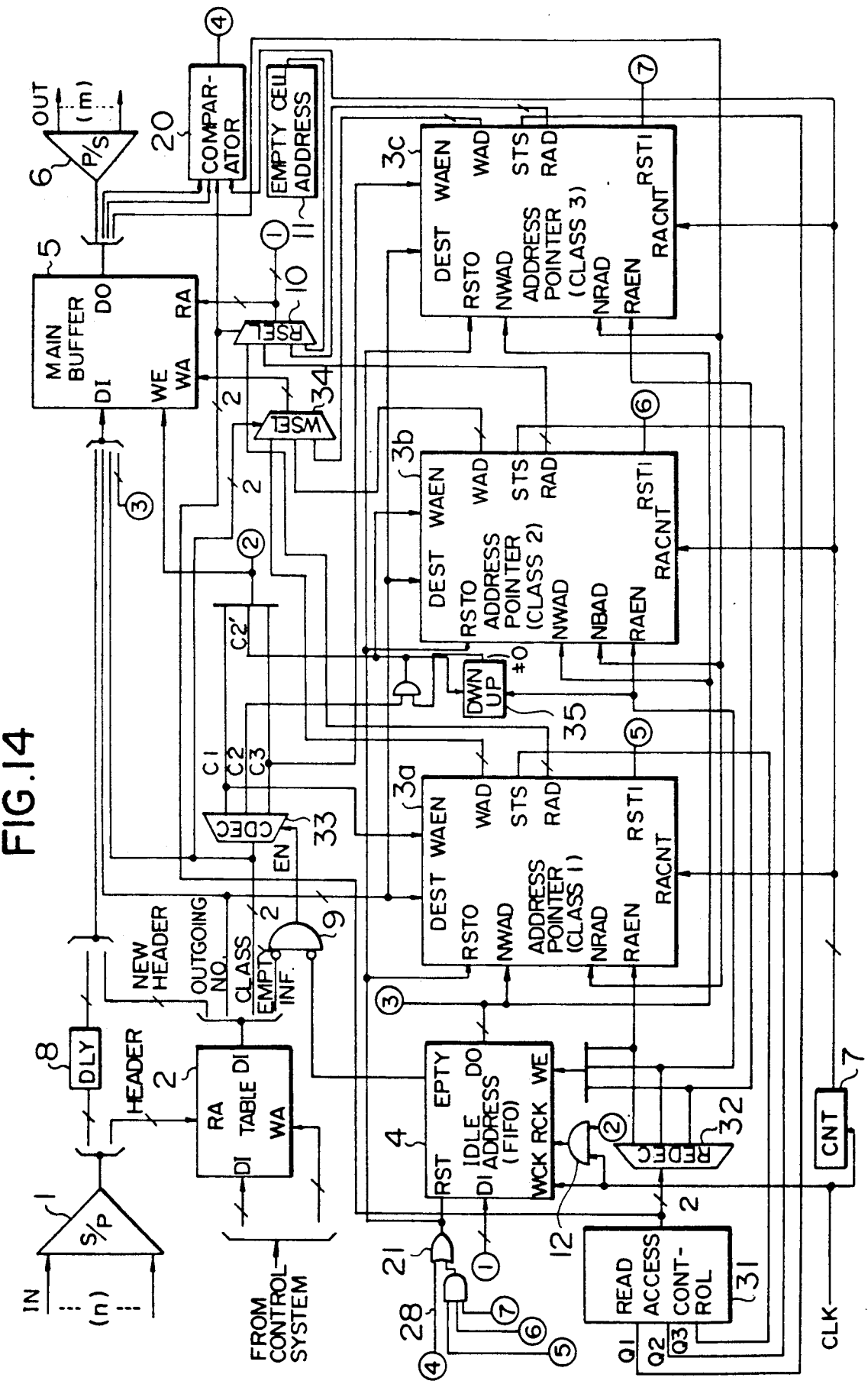

FIG. 14 illustrates the overall construction of a switching system according to a fifth embodiment of the invention wherein a priority control mechanism is additionally included. In FIG. 14, components identical to those shown in FIG. 1 are designated by identical reference characters. The FIG. 14 embodiment distinctively differs from the FIG. 1 system in that a plurality of address pointers are provided. Exemplarily, it is now assumed that the preference order of cell is sorted into three classes of class 1 (C1), class 2 (C2) and class 3 (C3). Accordingly, address pointers 3a–3c are provided corresponding to these classes.

For example the address counter 25 starts from "0000" address, it is counted up by one address sequentially each time that a matching output signal is produced from the comparator circuit, and after reaching "FFFF" address, it is returned to the "0000" address.

In the present embodiment, a system is presupposed in which the address chain for each outgoing highway is divided into a plurality of chains assigned with priority and corresponding to the classes and the chains are controlled in accordance with the classes, and a unit for detecting chain-breaking in any chain (here corresponding to the detection circuit 20 in FIG. 1, for example) is applied to the presupposed system.

Figures 15, 16:
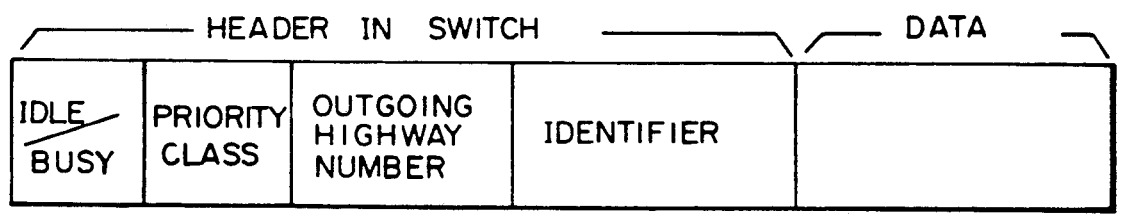
FIG. 15 is a table useful in explaining read access control logic in the FIG. 14 embodiment.
FIG. 16 is a diagram showing an example of the structure of cell.

A header conversion table 2 in FIG. 14 produces an output signal containing a class indicator for identification of a class. The class indicator output signal is connected to an input of a class decoder (CDEC) 33, a selection input of a write class selector (WSEL) 34 and an input of a main buffer 5. Decode outputs of the class decoder (CDEC) 33 are coupled to write address enable inputs (WAEN) of the address points 3a, 3b and 3c corresponding to the respective classes. Of decode output signals C1, C2 and C3 from the class decoder (CDEC) 33, the C2 output signal and an output signal of an up/down counter 35 are ANDed to provide a signal C2'. The C1 and C3 output signals from the class decoder (CDEC) 33 and the C2' signal are ORed to provide a signal supplied to a write enable input (WE) of the main buffer 5. Queue state display output signals (STS) Q3 Q2 and Q1 of the respective address pointers corresponding to the respective classes, that is, the address pointer (class 1) 3a, address pointer (class 2) 3b and address pointer (class 3) 3c are supplied to inputs of a read access control 31. An example of the relation between input and output signals of the read access control 31 is shown in FIG. 15. An output of the read access control 31 is coupled to a selection input of a read class selector (RSEL) 10, an input of a decoder (REDEC) 32 and one input of a comparator circuit 20. The up/down counter 35 operates by receiving a read address enable input signal (RAEN) to the class 2 address pointer as an up input signal and the C2 signal as a down signal.

The class is defined such that class 1 is for a small delay time amount and a small cell loss rate, class 2 is for a small delay time amount but a slightly large cell loss rate and class 3 is for a slightly large delay time amount but a small cell loss rate. The class 2 allowed to have a slightly larger loss rate than that for other classes limits usable capacity of the main buffer. More specifically, a usable capacity is initially set in the up/down counter 35 in terms of the number of cells. The up/down counter 35 operates to count down during writing and count up during reading, thus indicating that the used capacity of the main buffer equals its limit value when the count value reaches zero. In this case, the C2' output signal becomes "L" and writing of a new cell of this class is prevented. Accordingly, a cell of class 2 reaching at that time is discarded. As regards the delay time amount, on the other hand, the read access control 31 designates the preferential order of reading such that the class 1 is of the smallest and the class 3 is of the largest. More specifically, reading of cell for each outgoing highway is controlled such that in the presence of cells of class 1 within the main buffer, these cells are first read, cells of class 2 are then read following disappearance of queue of class 1 and finally cells of class 3 are read following disappearance of queue of class 2.

When a cell arrives, the header conversion table 2 delivers a class indicator signal for identifying a class to which the cell belongs and the class decoder 33 causes this signal to be supplied as a write address enable signal (WAEN) to an address pointer corresponding to the class. Responsive to this input signal, the address pointer produces a write address signal (WAD) which in turn is selected by the write class selector (WSEL) 34 so as to be used as a write address signal (WA) for the main buffer.

On the other hand, read control is such that the read access control 31 watches the presence or absence of a queue of each class in respect of each outgoing highway and the queues are delivered sequentially in accordance with the preferential order. More specifically, the output signal of the decoder 32 instructs an address pointer of a class which is to be read out. Then, the read class selector 10 selects a read address delivered out of the instructed address pointer to provide a read address for the main buffer.

When coincidence occurs between a write register and a read register which are provided in association with each outgoing highway, no cell is considered to be in the main buffer 5 and a reset signal is delivered out of each reset output RST1. The reset signal is applied through an AND gate 28 and an OR gate 21 to an idle address FIFO 4 and the address pointers 3a, 3b and 3c to initialize the same.

In FIG. 14, chains are prepared for different outgoing highways and different priority classes to perform buffering. Specifically, concurrently with writing a cell in the main buffer 5, its outgoing highway number and priority class are written; concurrently with reading the cell from the main buffer 5, the outgoing highway number and priority class are read; a read outgoing highway number from a control counter 7 is compared with the priority class from the read access control 31 at a comparator circuit 20 to check coincidence therebetween. If non-coincidence occurs, indicating that chain-breaking takes place, the comparator circuit 20 produces a output signal which is applied through the OR gate 21 to the idle address FIFO 4 and address points 3a, 3b and 3c to initialize the same.

Figure 17:
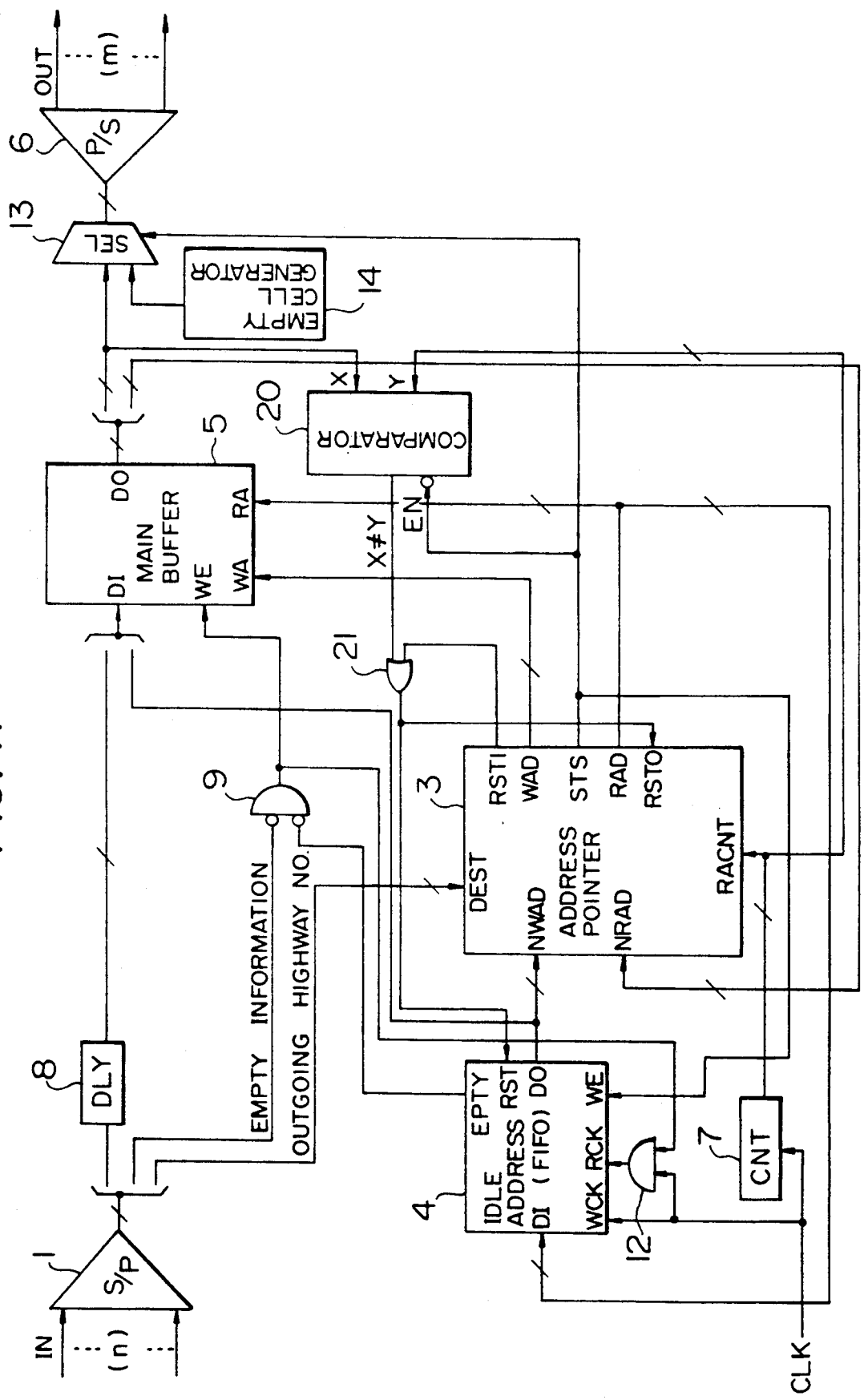
FIG. 17 is a block diagram illustrating a switching system according to a further embodiment of the invention.

Referring now to FIG. 17, a switching system according to a sixth embodiment of the invention will be described. In the FIG. 17 embodiment, the header conversion table 2, empty cell address 11 and selector 10 are omitted and instead an empty cell generator 14 and a selector 13 are provided. In this embodiment, a cell coming from an incoming highway has a structure as shown in FIG. 16. This cell format is suitable for the case where header conversion tables preceding the switching system are provided in association with respective incoming highways. Further, in a multi-stage switching system to be described later, in place of header conversion otherwise effected at each switching stage, integrated header conversion can advantageously be effected in advance. Further, since an outgoing highway number is described in a header of each cell, the outgoing highway number for which the cell is destined can be known at the time that the cell is read out of the main buffer 5, and coincidence between the outgoing highway number and a read cell outgoing highway number indicated by the control counter 7 can be checked at the comparator circuit 20. In this case, storage of one record of a cell and its outgoing highway number as in the case of FIG. 1 embodiment is not needed.

In the FIG. 17 embodiment, the empty cell generator 14 and selector 13 are provided in place of the empty cell address 11 and selector 10 and when the STS output signal of the address pointer 3 indicates that no read cell is present, the empty cell generator 14 delivers an empty cell pattern which is fed to a parallel/serial conversion demultiplexer 6 through the selector 13. According to this method, with the empty cell pattern simplified to, for example, an all zero bit pattern, the empty cell generator 14 can be simplified structurally with the amount of hardware reduced greatly and besides entering of empty cell pattern and maintenance of empty address are not required of the main buffer. This scheme may also be applied to the embodiments of FIGS. 1, 9, 11, 13 and 14 described previously.

It will be appreciated that it is possible to use in desirable combination the system shown in FIG. 8 wherein the up/down counters are provided in association with the individual outgoing highways, the system shown in FIGS. 9 and 10 wherein the sequence number is used for checking, the system shown in FIGS. 11 and 12 wherein the check bit is added, the system shown in FIG. 13 wherein the address is watched, the system shown in FIG. 14 wherein the priority class is provided, and the system shown in FIG. 17 wherein the header conversion table is omitted and instead the header of each cell is added with the outgoing highway number.

In the foregoing embodiments, the cell has been described as being a fixed length cell but the invention may also be applied to a variable length cell.

Figure 6:
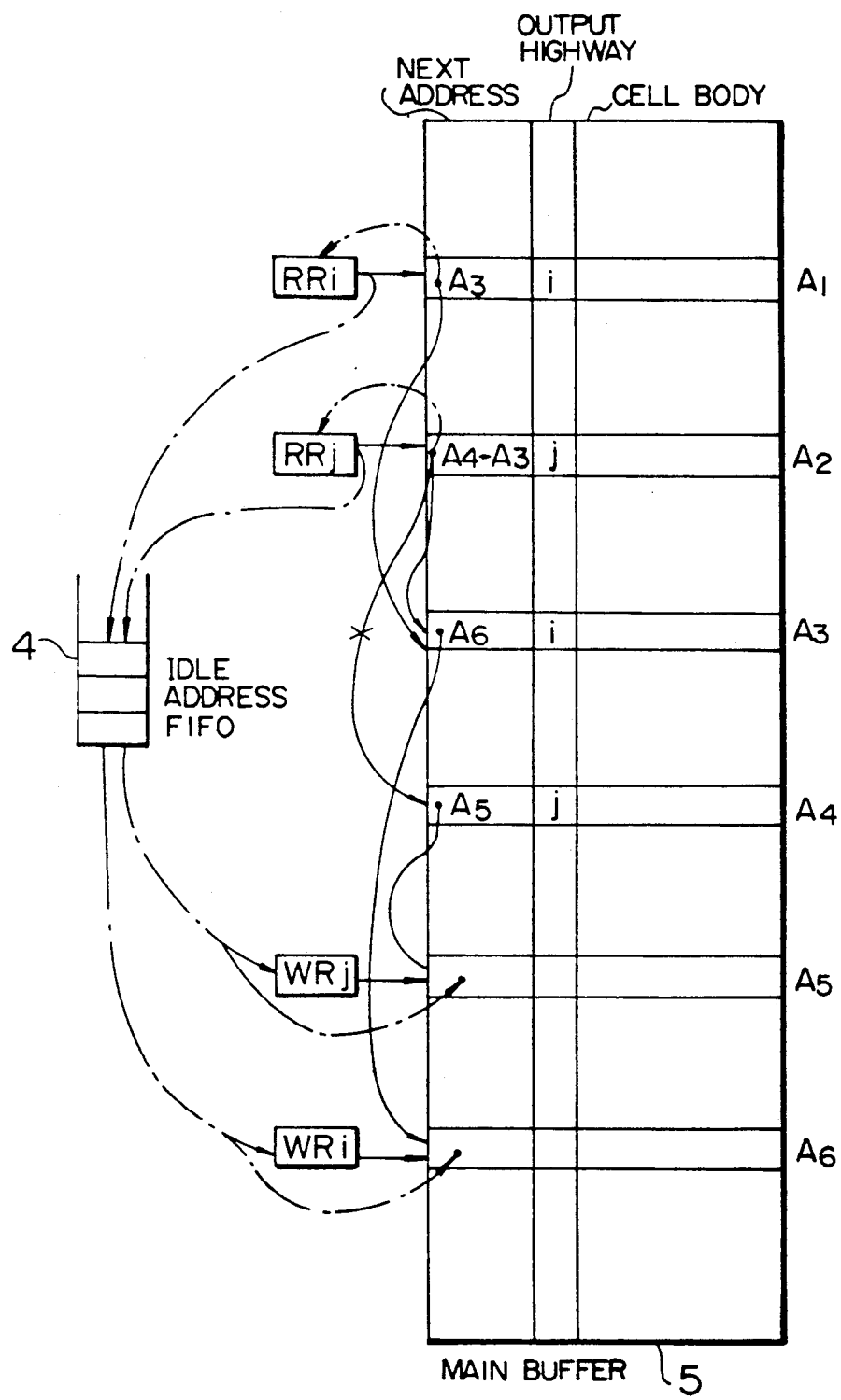
FIG. 6 is a diagram for explaining a mode of chain-breaking of cell address.

While the foregoing embodiments have been described by referring to the case where an error is caused in the next address to be written in the main buffer as shown in FIGS. 6, 7A and 7B, the invention may also be applied to detection of an error caused in the write address or read address for the main buffer owing to a certain cause.

Further, the comparator circuit 20 in the embodiments of FIGS. 8, 9, 11 and 13 may be omitted.

We claim:

1. A switching system comprising:
   a plurality of incoming highways and a plurality of outgoing highways;
   a main buffer for storing cells received from said incoming highways;
   write registers and read registers which are provided in association with respective outgoing highways; and
   an idle address buffer for storing an idle address of said main buffer,
   data being stored in said main buffer in unit of a record of a current cell and an address of a cell to be read subsequently,
   a read address for a record to be read in association with an outgoing highway and an address for a new record being stored in said read register and said write register, respectively, and
   buffering in a main buffer a chain of addresses associated with each outgoing highway being effected which starts at the address stored in said read register and ends at the address stored in said write register,
   wherein each record stored in said main buffer contains a current cell, an identifier indicative of an outgoing highway to which the cell is to be delivered and an address of a cell to be read subsequently, and means is provided for comparing, when one record is read out of said main buffer in respect of an outgoing highway on the basis of the address stored in said read register, an outgoing highway identifier in said record with the outgoing highway to which said record is to be delivered, so as to initialize, upon occurrence of unmatch, at least one of said read register, write register and idle address buffer.

2. A switching system having a plurality of incoming highways subjected to time-division multiplexing, a main buffer for temporarily storing cells received from said incoming highways and each having a header section and a data section, outgoing highways to which cells read out of said main buffer and demultiplexed are delivered, an idle address buffer for storing idle addresses for said main buffer, and write registers and read registers which are provided in association with respective outgoing highways, wherein a data output of said idle address buffer is coupled to input terminals of the write registers and to a data input terminal of said main buffer, and output terminals of said write registers are coupled to a write address terminal of said main buffer through a selector receiving a selection input signal indicative of a destination outgoing highway number of an incoming cell so that upon writing of cell in said main buffer, an incoming cell and a next address combined therewith at which a subsequently reaching cell having the same destination outgoing highway number as that of said incoming cell is to be written are written at the same address in said main buffer and a write register associated with the outgoing highways for which said incoming cell is destined is updated by said next address, and a data output terminal of said main buffer is coupled to input terminals of the read registers, and output terminals of said read registers are coupled to a read address terminal of said main buffer through a selector receiving a selection input signal standing for an output signal of counter means adapted to generate a read timing signal for each outgoing highway and to a data input of said idle address buffer so that upon reading of cell from said main buffer, said incoming cell and said next address are read in combination and a read register associated with said destination outgoing highway is updated by said next address, thereby performing switching of cells and buffering in a main buffer a chain of addresses associated with each destination outgoing highway, said switching system comprising:

first detection means for detecting that an address in a write register associated with one of the outgoing highways is equal to that in a read register associated with the one outgoing highway for each of all the outgoing highways;

second detection means for writing, upon writing of cell in said main buffer, an incoming cell, a next address and a destination outgoing highway occurring when writing in combination at the same address in said main buffer, reading, upon reading of cell from said main buffer, said cell, said next address and said destination outgoing highway in combination and detecting unmatch between a destination outgoing highway indicated by said counter means adapted to generate a read timing signal for each outgoing highway and said destination outgoing highway read out of said main buffer;

first initialization mean of initializing said write register and read register provided in association with each outgoing highway; and second initialization means for generating a next address, for writing said next address and a cell in combination in said main buffer at the same address, for updating a write register associated with an outgoing highway for which said cell is destined, and upon completion of the above operation, for causing said idle address buffer to generate an address, said first and second initialization means being operated by at least one of said first and second detection means.

3. A switching system according to claim 2 further comprising:

first counter means provided in association with the individual outgoing highways and operable to count up when a cell for an associated outgoing highway is written in said main buffer and count down when said cell for said outgoing highway is read out of said main buffer;

third detection means operable to detect unmatch between the time when the count value of said first counter means associated with an outgoing highway is zero and the time when addresses in a write register and a read register associated with said outgoing highway coincide with each other; and third initialization means for resetting said first counter means to zero, said first, second and third initialization means being operated by said first, second or third detection means.

4. A switching system according to claim 2 further comprising:

means provided in association with the individual outgoing highways and operable to generate a first sequence number which is incremented by one each time that cells for an outgoing highway are each written in said main buffer and which becomes zero when reaching an upper limit and write, concurrently with writing of a cell in said main buffer, a next address and a destination outgoing highway in said main buffer at the same address;

means provided in association with the individual outgoing highways and operable to generate a second sequence number which is incremented by one each time that the cells for said outgoing highway are each read out of said main buffer and which becomes zero when reaching an upper limit;

fourth detection means for detecting unmatch between the second sequence number and a third sequence number read out of said main buffer concurrently with reading of a cell from the same address; and fourth initialization means associated with the individual outgoing highways, for making zero said first and second sequence numbers, said first, second and fourth initialization means being initialized by said first, second or fourth detection means.

5. A switching system according to claim 2 further comprising:

means for adding a check bit to an output signal of means included in said second initialization means and operable to fill the role of said idle address buffer to generate a next address; and fifth detection means for checking the next address with the check bit before it is written in said main buffer or after it is read out of said main buffer.

said first and second initialization means being operated by said first, second or fifth detection means.

6. A switching system according to claim 2 further comprising:

means for generating an address for said main buffer;

sixth detection means for comparing a next address before it is written in said main buffer or after it is read out of said main buffer with the address from said address generator to detect matching therebetween so as to update the address generated from said address generator; and means for counting time reset by said sixth detection means, said first and second initialization means being operated when said means for counting time exceeds a threshold value.

7. A switching system for processing a plurality of cells, each cell including a header section and a data section, and for exchanging a communication message contained in the data section of the cell between a plurality of incoming highways and a plurality of outgoing highways according to the data contained in the header section of the cell, comprising:

means for multiplexing said incoming highways in time division;

first memory means having addressable storage locations for storing cells received from said multiplexing means;

means for demultiplexing and distributing data output from said first memory means among a plurality of outgoing highways;

second memory means for storing an empty address of an empty storage location of the first memory means;

means for controlling the write and read operations of said first memory means in accordance with an empty address stored in the second memory means used as write and read addresses; and means for detecting an error in at least one of the write address and read address and producing an error signal.

8. A switching system according to claim 7, wherein said controlling means includes first means for storing in said first memory means an empty address from said second memory means as a next address together with a cell received from said multiplexing means, and second means for storing said empty address for use as a write address to store the next cell received from said multiplexing means for a given outgoing highway in said first memory means.

9. A switching system according to claim 8, wherein said controlling means further includes third means for storing a next address read out of said first memory means at the time a cell is read out of said first memory means for a given outgoing highway, and means for reading another cell from said first memory means for said given outgoing highway using the address stored in said third means.

10. A switching system according to claim 9, wherein said controlling means also includes means for storing said address in said third means into said second memory means when that address is used to read said another cell from said first memory means.

11. A switching system according to claim 8 further comprising means responsive to said error signal to initialize at least one of said second memory means, second means and third means.

12. A switching system for processing a plurality of cells, each cell including a header section and a data section, and for exchanging a communication message contained in the data section of the cell between a plurality of incoming highways and a plurality of outgoing highways according to the data contained in the header section of the cell, comprising:

means for multiplexing said incoming highways in time division;

first memory means having addressable locations for storing cells received from said multiplexing means;

means for demultiplexing and distributing a cell read from said first memory means to one of the plurality of outgoing highways designated by an outgoing highway identifier in the header section of the cell;

second memory means for storing an empty address of an empty storage location of the first memory means;

first means for storing in said first memory means an empty address from said second memory means as a next address together with a cell received from said multiplexing means;

second means for storing the next address read out of said first memory means in correspondence to an outgoing highway identifier indicated by the cell stored, together with said next address in said first means;

write address generator means for reading from said second means a next cell having the same outgoing highway identifier as that of a next cell received from said multiplexing means and applying it, as a write address, to said first memory means to store the next cell in said first memory means;

means for generating a read timing signal for an outgoing highway identifier;

third means for storing a next address read out of said first memory means together with a cell, in correspondence to an outgoing highway identifier of said read-out cell;

read address generator means responsive to the read timing signal, for reading from said third means a next address corresponding to an outgoing highway identifier indicated by said timing signal and applying it, as a read address, to said first memory means; and error detection means for detecting an error in at least one of said read address and write address and for delivering an error signal indicative of an error when the error is detected.

13. A switching system according to claim 12 further comprising means responsive to the error signal, for initializing at least one of said second memory means, second means and third means.

14. A switching system according to claim 12, wherein the read address delivered out of said read address generator means is applied, as an empty address, to said second memory means.

15. A switching system according to claim 12, wherein said error detection means includes first comparator means for comparing the outgoing highway identifier of the cell read out of said first memory means with the outgoing highway identifier indicated by said timing signal, and means for delivering an error signal indicating that an error occurred in at least one of said read address and write address when the comparison results determine unmatch between the two identifier signals.

16. A switching system according to claim 13 further comprising second comparator means for comparing a write address corresponding to one outgoing highway identifier in said second means with a read address corresponding to the same outgoing highway identifier in said third means to check matching therebetween in respect of each outgoing highway identifier, and means for applying an initialization signal to said initialization means when said second comparator means determines matching between a write address and a read address corresponding to each of all the outgoing highways, said initialization means being responsive to said initialization signal to initialize at least one of said second memory means, second means and third means.

17. A switching system according to claim 16 further comprising matching detection means for checking matching or unmatching between the number of write operations of a write address corresponding to one outgoing highway identifier in said second means and the number of read operations of a read address corresponding to the same outgoing highway identifier in said third means, in respect of the individual outgoing highway identifiers, and means for applying an error signal to said initialization means when said matching detection means determines unmatch between the number of write operations of a write address and the number of read operations of a read address in respect of one outgoing highway identifier or said second comparator means determines unmatch between the read address and the write address in respect of said one outgoing highway.

18. A switching system according to claim 13 further comprising means responsive to a cell received from said multiplexing means, for generating a first sequence number indicative of the order of storage of the cell in said first memory means in respect of an outgoing highway identifier indicated by said cell and storing the first sequence number together with said cell in said first memory means, means responsive to the read timing signal, for generating a second sequence number indicative of the order of generation of said timing signal in respect of an outgoing highway identifier indicated by said timing signal, and means for comparing the first sequence number read out of said first memory means together with the cell with the second sequence number and generating and applying a second error signal to said initialization means when the two sequence numbers do not match with each other.

19. A switching system according to claim 13 further comprising means for adding a check bit to a next address delivered out of said second memory means, means for receiving a next address and a check bit which are read out of said first memory means together with a cell, checking them to decide whether an error occurs in the next address and generating a fourth error signal to said initialization means when the error is determined.

20. A switching system according to claim 14 further comprising means for deciding whether a next address corresponding to an empty address is read out of said first memory means within a predetermined time in respect of individual empty addresses in said second memory means and generating a fifth error signal to said initialization means when the next address is determined not to be read out.

21. A switching system according to claim 13 further comprising second comparator means for comparing a write address, in said second means, corresponding to one outgoing highway identifier indicated by the read timing signal with a read address, in said third means, corresponding to the same outgoing highway identifier to check matching or unmatch therebetween, and means responsive to said current read timing signal, for generating and applying an empty cell pattern to said demultiplexing means when said second comparator means determines matching between the corresponding write and read addresses in respect of said one outgoing highway identifier.

22. A switching system for processing a plurality of cells, each cell including a header section and a data section, and for exchanging a communication message contained in the data section of the cell between a plurality of incoming highways and a plurality of outgoing highways according to the data contained in the header section of the cell, comprising:
a serial to parallel converter for converting said incoming highways from serial to parallel;
first memory means having addressable storage locations for storing cells received from said serial to parallel converter;
a parallel to serial converter for converting data output from said first memory means from parallel to serial and outputting said data to a plurality of outgoing highways;
second memory means for storing an empty address of an empty storage location of the first memory means;
means for controlling the write and read operations of said first memory means in accordance with an empty address stored in the second memory means used as write and read addresses; and
means for detecting an error in at least one of the write address and read address and producing an error signal.

23. A switching system according to claim 22, wherein said controlling means includes first means for storing in said first memory means an empty address from said second memory means as a next address together with a cell received from said multiplexing means, and second means for storing said empty address for use as a write address to store the next cell received from said serial to parallel converter for a given outgoing highway in said first memory means.

24. A switching system according to claim 23, wherein said controlling means further includes third means for storing a next access read out of said first memory means at the time a cell is read out of said first memory means for a given outgoing highway, and means for reading another cell from said first memory means for said given outgoing highway using the address stored in said third means.

25. A switching system according to claim 24, wherein said controlling means also includes means for storing said address in said third means into said second memory means when that address is used to read said another cell from said first memory means.

26. A switching system according to claim 23 further comprising means responsive to said error signal to initialize at least one of said second memory means, second means and third means.

27. A switching system for processing a plurality of cells, each cell including a header section and a data section, and for exchanging a communication message contained in the data section of the cell between a plurality of incoming highways and a plurality of outgoing highways according to the data contained in the header section of the cell, comprising:
a serial to parallel converter for converting said incoming highways for serial to parallel;
first memory means having addressable locations for storing cells received from said multiplexing means;
a parallel to serial converter for converting a cell read from said first memory means from parallel to serial and outputting said cell to one of the plurality of outgoing highways designated by an outgoing highway identifier in the header section of the cell;

second memory means for storing an empty address of an empty storage location of the first memory means;

first means for storing in said first memory means an empty address from said second memory means as a next address together with a cell received from said serial to parallel converter;

second means for storing the next address read out of said first memory means in correspondence to an outgoing highway identifier indicated by the cell stored, together with said next address in said first means;

write address generator means for reading from said second means a next cell having the same outgoing highway identifier as that of a next cell received from said serial to parallel converter and applying it, as a write address, to said first memory means to store the next cell in said first memory means;

means for generating a read timing signal for an outgoing highway identifier;

third means for storing a next address read out of said first memory means together with a cell, in correspondence to an outgoing highway identifier of said read-out cell;

read address generator means responsive to the read timing signal, for reading from said third means a next address corresponding to an outgoing highway identifier indicated by said timing signal and applying it, as a read address, to said first memory means; and error detection means for detecting an error in at least one of said read address and write address and for delivering an error signal indicative of an error when the error is detected.

28. A switching system according to claim 27, further comprising means responsive to the error signal, for initializing at least one of said second memory means, second means and third means.

29. A switching system according to claim 27, wherein the read address delivered out of said read address generator means is applied, as an empty address, to said second memory means.

30. A switching system according to claim 26, wherein said error detection means includes first comparator means for comparing the outgoing highway identifier of the cell read out of said first memory means with the outgoing highway identifier indicated by said timing signal, and means for delivering an error signal indicating that an error occurred in at least one of said read address and write address when the comparison results determine unmatch between the two identifier signals.

31. A switching system according to claim 28 further comprising second comparator means for comparing a write address corresponding to one outgoing highway identifier in said second means with a read address corresponding to the same outgoing highway identifier in said third means to check matching therebetween in respect of each outgoing highway identifier, and means for applying an initialization signal to said initialization means when said second comparator means determines matching between a write address and a read address corresponding to each of the outgoing highways, said initialization means being responsive to said initialization signal to initialize at least one of said second memory means, second means and third means.

32. A switching system according to claim 31 further comprising matching detection means for checking matching or unmatching between the number of write operations of a write address corresponding to one outgoing highway identifier in said second means and the number of read operations of a read address corresponding to the same outgoing highway identifier in said third means, in respect of the individually outgoing highway identifiers, and means for applying an error signal to said initialization means when said matching detection means determines unmatch between the number of write operations of a write address and the number of read operations of a read address in respect of one outgoing highway identifier or said second comparator means determines unmatch between the read address and the write address in respect of said one outgoing highway.

33. A switching system according to claim 28 further comprising means responsive to a cell received from said multiplexing means, for generating a first sequence number indicative of the order of storage of the cell in said first memory means in respect of an outgoing highway identifier indicated by said cell and storing the first sequence number together with said cell in said first memory means, means responsive to the read timing signal, for generating a second sequence number indicative of the order of generation of said timing signal in respect of an outgoing highway identifier indicated by said timing signal, and means for comparing the first sequence number read out of said first memory means together with the cell with the second sequence number and generating and applying a second error signal to said initialization means when the two sequence numbers do not match with each other.

34. A switching system according to claim 28 further comprising means for adding a check bit to a next address delivered out of said second memory means, means for receiving a next address and a check bit which are read out of said first memory means together with a cell, checking them to decide whether an error occurs in the next address and generating a fourth error signal to said initialization means when the error is determined.

35. A switching system according to claim 29 further comprising means for deciding whether a next address corresponding to an empty address is read out of said first memory means within a predetermined time in respect of individually empty addresses in said second memory means and generating a fifth error signal to said initialization means when the next address is determined not to be read out.

36. A switching system according to claim 28 further comprising second comparator means for comparing a write address, in said second means, corresponding to one outgoing highway identifier indicated by the read timing signal with a read address, in said third means, corresponding to the same outgoing highway identifier to check matching or unmatched therebetween, and means responsive to said current read timing signal, for generating and applying an empty cell pattern to said demultiplexing means when said second comparator means determines matching between the corresponding write and read addresses in respect of said one outgoing highway identifier.

* * * * *